United States Patent
Stephenne et al.

(10) Patent No.: US 10,314,039 B2
(45) Date of Patent: Jun. 4, 2019

(54) INTERFERENCE AND TRAFFIC PATTERN DATABASE

(71) Applicant: Telefonaktiebolaget L M Ericsson (publ), Stockholm (SE)

(72) Inventors: Alex Stephenne, Stittsville (CA); Wayne Ding, Ottawa (CA); Leonard Lightstone, Ottawa (CA); Dongsheng Yu, Ottawa (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 138 days.

(21) Appl. No.: 14/904,899

(22) PCT Filed: Nov. 24, 2015

(86) PCT No.: PCT/IB2015/059087
§ 371 (c)(1),
(2) Date: Jan. 13, 2016

(87) PCT Pub. No.: WO2017/089864
PCT Pub. Date: Jun. 1, 2017

(65) Prior Publication Data
US 2017/0265189 A1    Sep. 14, 2017

(51) Int. Cl.
*H04W 72/04* (2009.01)
*G06F 16/22* (2019.01)
(Continued)

(52) U.S. Cl.
CPC ........ *H04W 72/0453* (2013.01); *G06F 16/22* (2019.01); *G06F 16/2455* (2019.01);
(Continued)

(58) Field of Classification Search
CPC ......... H04W 72/0453; H04W 72/0473; H04W 72/082; H04W 72/048; H04W 64/006;
(Continued)

(56) References Cited

U.S. PATENT DOCUMENTS

2010/0128673 A1* 5/2010 Yamazaki ............ H04B 7/0617
370/328
2012/0257585 A1  10/2012 Sydor et al.
(Continued)

OTHER PUBLICATIONS

Hildebrand, Matthias, et al., "Location-based Radio Resource Management in Multi Standard Wireless Network Environments," Proceedings of the IST Mobile and Wireless Communications Summit, Thessaloniki, Greece, Jun. 2002, 5 pages.
(Continued)

*Primary Examiner* — Vinncelas Louis
(74) *Attorney, Agent, or Firm* — Withrow & Terranova, PLLC

(57) ABSTRACT

Systems and methods are described herein relating to building and using one or more databases storing position-pair-dependent and/or node-dependent interference related information in a cellular communications system. In some embodiments, a method of operation of a node associated with one or more cellular communications networks includes obtaining position-pair-dependent interference related information for pairs of positions. The position-pair-dependent interference related information includes, for each pair of positions including a first position and a second position, information regarding interference caused by wireless transmissions originating at the first position to wireless receptions at the second position. The method further includes storing interference related information including the position-pair-dependent interference related information in one or more databases and providing access to the one or more databases. The database(s) enable, for example, improved location-based Radio Resource Management (RRM).

37 Claims, 10 Drawing Sheets

(51) Int. Cl.
*G06F 16/2455* (2019.01)
*H04W 64/00* (2009.01)
*H04W 72/08* (2009.01)
*H04W 72/12* (2009.01)
*H04B 1/7107* (2011.01)
*H04B 1/10* (2006.01)
*H04W 24/00* (2009.01)
*H04W 28/02* (2009.01)
*H04W 4/02* (2018.01)

(52) U.S. Cl.
CPC ....... *H04W 64/003* (2013.01); *H04W 64/006* (2013.01); *H04W 72/048* (2013.01); *H04W 72/0473* (2013.01); *H04W 72/082* (2013.01); *H04W 72/1231* (2013.01); *H04B 1/10* (2013.01); *H04B 1/7107* (2013.01); *H04W 4/02* (2013.01); *H04W 24/00* (2013.01); *H04W 28/0236* (2013.01)

(58) Field of Classification Search
CPC ............ H04W 72/1231; H04W 64/003; G06F 17/30312; H04B 1/10; H04B 1/7107
See application file for complete search history.

(56) References Cited

U.S. PATENT DOCUMENTS

2015/0078259 A1    3/2015  Junior et al.
2015/0163818 A1*   6/2015  Abdelmonem ....... H04L 5/0026
                                                        455/452.1

OTHER PUBLICATIONS

Jeung, Hoyoung, et al., "Path prediction and predictive range querying in road network databases," The International Journal on Very Large Data Bases, vol. 19, Issue 4, May 19, 2010, Springer-Verlag, pp. 585-602.

Nadembega, Apollinaire, et al., "A Destination & Mobility Path Prediction Scheme for Mobile Networks," IEEE Transactions on Vehicular Technology, vol. 64, Issue 6, Jun. 2015, IEEE, 14 pages.

Qualcomm, "Creating a Digital 6th Sense with LTE Direct," Technology Presentation, Jul. 2014, Qualcomm Technologies, Inc., 35 pages.

International Search Report and Written Opinion for International Patent Application No. PCT/IB2015/059087, dated Jul. 22, 2016, 17 pages.

Written Opinion for International Patent Application No. PCT/IB2015/059087, dated Oct. 26, 2017, 12 pages.

* cited by examiner

INTERFERENCE AND TRAFFIC PATTERN DATABASE

This application is a 35 U.S.C. § 371 national phase filing of International Application No. PCT/IB2015/059087, filed Nov. 24, 2015, the disclosure of which is incorporated herein by reference in its entirety.

TECHNICAL FIELD

The present disclosure relates to interference in a cellular communications system and, in particular, to interference related information.

BACKGROUND

This disclosure pertains to interference in cellular communications systems. In particular, the disclosure pertains to interference information in conjunction with some or all of the following: Radio Resource Management (RRM), Coordinated Multi-Point (CoMP) communication, Machine Type Communications (MTC), Device-to-Device (D2D) communication, and use of frequency spectrum such as the Television (TV) White Space.

RRM refers to a system level control of radio resources such as user scheduling, link adaptation, handover, and transmit power.

CoMP transmission/reception, also known as the Multi-point Cooperative Communication (MCC) technology, is a technique to improve the network performance specially by boosting up the cell edge throughput. In CoMP enabled systems, Base Stations (BSs) are grouped into cooperation clusters, each of which contains a subset of a network's BSs. The BSs of each of the clusters exchange information and jointly process signals by forming virtual antenna arrays distributed in space. Furthermore, multiple User Equipment devices (UEs) can also simultaneously receive their signals from one or multiple transmission points in a coordinated or joint-processing manner.

MTC or Machine to Machine (M2M) communication relates to machines communicating directly with one another. As used herein, an MTC device is a wireless device that performs MTC or M2M communication. The use of the MTC devices can be a great opportunity for telecommunication operators to extend their network without significant costs. In M2M communications, MTC devices such as smart meters, signboards, cameras, remote sensors, laptops, appliances are connected to the cellular communications network. In most cases, MTC devices are expected to have low mobility, e.g., they are stationary or semi-stationary.

D2D communication has been developed to meet growing capacity demands due to rapid growth of wireless data services. In a D2D communication scenario, two UE devices directly communicate with each other without having the payload traversed through the backhaul network. D2D communication can potentially scale the capacity of the network, improve network resource utilization, such as network throughput, spectrum utilization, reduce transmission delays, and offload traffic from the network nodes, as well as improve coverage for UEs that do not have network coverage.

TV White Space refers to the unused TV channels between the active channels in the Very High Frequency (VHF) and Ultra High Frequency (UHF) spectrum. In the past, these buffers were placed between active TV channels to protect broadcasting interference. In recent years, the Federal Communications Commission (FCC) made this spectrum available for unlicensed public use.

There is a need in the art to improve the RRM, COMP, D2D, and MTC and to make better use of frequency spectrum such as the TV White Space.

SUMMARY

Systems and methods are described herein relating to building and using one or more databases storing position-pair-dependent and/or node-dependent interference related information in a cellular communications system. In some embodiments, a method of operation of a node associated with one or more cellular communications networks comprises obtaining position-pair-dependent interference related information for pairs of positions. The position-pair-dependent interference related information comprises, for each pair of positions comprising a first position and a second position, information regarding interference caused by wireless transmissions originating at the first position to wireless receptions at the second position. The method further comprises storing interference related information comprising the position-pair-dependent interference related information in one or more databases and providing access to the one or more databases. The database(s) enable, for example, improved location-based Radio Resource Management (RRM).

In some embodiments, the method comprises obtaining node-dependent interference related information for at least one of a plurality of wireless devices. Storing the interference related information comprises storing the interference related information comprising the position-pair-dependent interference related information for the pairs of positions and the node-dependent interference related information for at least one of the plurality of wireless devices in the one or more databases.

In some embodiments, for each wireless device of the at least one of the plurality of wireless devices, the node-dependent interference related information comprises transmit pattern information for the wireless device. In some embodiments, the transmit pattern information for the wireless device comprises information indicative of one or more future time periods during which the wireless device will be transmitting, one or more frequency resources or other detection space on which the wireless device will be transmitting during the one or more future time periods, and one or more transmit power levels at which the wireless device will be transmitting during the one or more future time periods. Further, in some embodiments, the transmit pattern information for the wireless device further comprises information indicative of one or more beam patterns in which the wireless device will be transmitting during the one or more future time periods.

In some embodiments, for each wireless device of the at least one of the plurality of wireless devices, the node-dependent interference related information comprises receive pattern information for the wireless device. In some embodiments, the receive pattern information for the wireless device comprises information indicative of one or more future time periods during which the wireless device will be receiving and one or more frequency resources or other detection space on which the wireless device will be receiving during the one or more future time periods. In some embodiments, the receive pattern information for the wireless device further comprises information indicative of one or more beam patterns from which the wireless device will be receiving during the one or more future time periods. In some embodiments, the receive pattern information for the wireless device further comprises information indicative of one or more predicted noise floor levels at the wireless device during the one or more future time periods.

In some embodiments, each position in the pairs of positions is represented as one or more of a group consisting of: an absolute position in a discretization of two-dimensional or three-dimensional space, a relative position that is relative to a reference point, and an identifier of a stationary or semi-stationary wireless device.

In some embodiments, the position-pair-dependent interference related information for at least some of the pairs of positions comprises path loss for a wireless communication path between the first position and the second position.

In some embodiments, the position-pair-dependent interference related information for at least some of the pairs of positions comprises receive power for wireless receptions at the second position for wireless transmissions from the first position.

In some embodiments, providing access to the one or more databases comprises receiving a request for position-pair-dependent interference related information for a position and returning the position-pair-dependent interference related information stored in the one or more databases for any of the pairs of positions that include the position as the second position.

In some embodiments, a method of operation of a node associated with one or more cellular communications networks comprises obtaining position-pair-dependent interference related information for a position of a receive node from one or more databases. The position-pair-dependent interference related information for the position of the receive node comprises, for each of one or more position pairs each comprising a first position and a second position corresponding to the position of the receive node, information regarding interference caused by wireless transmissions originating at the first position to wireless receptions at the second position. The method further comprises identifying one or more interfered node and interfering node pairs having an interference level that is greater than a predefined threshold based on the position-pair-dependent interference related information for the position of the receive node. Each interfered node and interfering node pair corresponds to a different position pair of the one or more position pairs. Further, for each interfered node and interfering node pair, the interfered node is the receive node having the position that corresponds to the second position in the corresponding position pair and the interfering node is a transmit node having a position that corresponds to the first position in the corresponding position pair, and the interference level for the interfered node and interfering node pair is indicated by the position-pair-dependent interference related information for the corresponding position pair. The method further comprises taking one or more actions with respect to mitigating interference to the receive node from at least one of the interfering nodes in the one or more interfered node and interfering node pairs.

In some embodiments, the position-pair-dependent interference related information for at least some of the one or more position pairs comprises path loss for a wireless communication path between the first position and the second position.

In some embodiments, the position-pair-dependent interference related information for at least some of the one or more position pairs comprises receive power for wireless receptions at the second position for wireless transmissions from the first position.

In some embodiments, the method further comprises obtaining, from the one or more databases, node-dependent interference related information for each of the transmit nodes and the receive node in the one or more interfered node and interfering node pairs. Taking the one or more actions comprises identifying at least one of the interfering nodes of the one or more interfered node and interfering node pairs as a dominant interferer based on the node-dependent interference related information.

In some embodiments, for each of the transmit nodes, the node-dependent interference related information comprises transmit pattern information for the transmit node. In some embodiments, the transmit pattern information for the transmit node comprises information indicative of one or more future time periods during which the transmit node will be transmitting, one or more frequency resources or other detection space on which the transmit node will be transmitting during the one or more future time periods, and one or more transmit power levels at which the transmit node will be transmitting during the one or more future time periods. In some embodiments, the transmit pattern information for the transmit node further comprises information indicative of one or more beam patterns in which the transmit node will be transmitting during the one or more future time periods.

In some embodiments, the node-dependent interference related information comprises receive pattern information for the receive node. In some embodiments, the receive pattern information for the receive node comprises information indicative of one or more future time periods during which the receive node will be receiving and one or more frequency resources or other detection space on which the receive node will be receiving during the one or more future time periods. In some embodiments, the receive pattern information for the receive node further comprises information indicative of one or more beam patterns from which the receive node will be receiving during the one or more future time periods. In some embodiments, the receive pattern information for the receive node further comprises information indicative of one or more predicted noise floor levels at the receive node during the one or more future time periods.

In some embodiments, each position of each position in the one or more position pairs is represented as one or more of a group consisting of: an absolute position in a discretization of two-dimensional or three-dimensional space, a relative position that is relative to a reference point, and an identifier of a stationary or semi-stationary wireless device.

In some embodiments, the receive node is a stationary or semi-stationary wireless device. Further, in some embodiments, the position of the receive node is represented as a node identifier of the receive node. In some embodiments, the transmit nodes of the one or more interfered node and interfering node pairs are stationary or semi-stationary wireless devices. Further, in some embodiments, the position of the receive node is represented as a node identifier of the receive node, and the position of each of the transmit nodes is represented as a node identifier of the transmit node.

In some embodiments, the receive node is a mobile wireless device, and the position of the mobile wireless device is a predicted future position of the mobile wireless device. In some embodiments, the predicted future position of the mobile wireless device is represented as at least one of a group consisting of: an absolute position in a discretization of two-dimensional or three-dimensional space, and a relative position that is relative to a reference point.

In some embodiments, the transmit nodes of the one or more interfered node and interfering node pairs are mobile wireless devices, and the positions of the transmit nodes are predicted future positions of the transmit nodes. In some embodiments, the predicted future position each of the receive node and the transmit nodes is represented as at least one of one of a group consisting of: an absolute position in a discretization of two-dimensional or three-dimensional space, and a relative position that is relative to a reference point.

Embodiments of a node are also disclosed.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
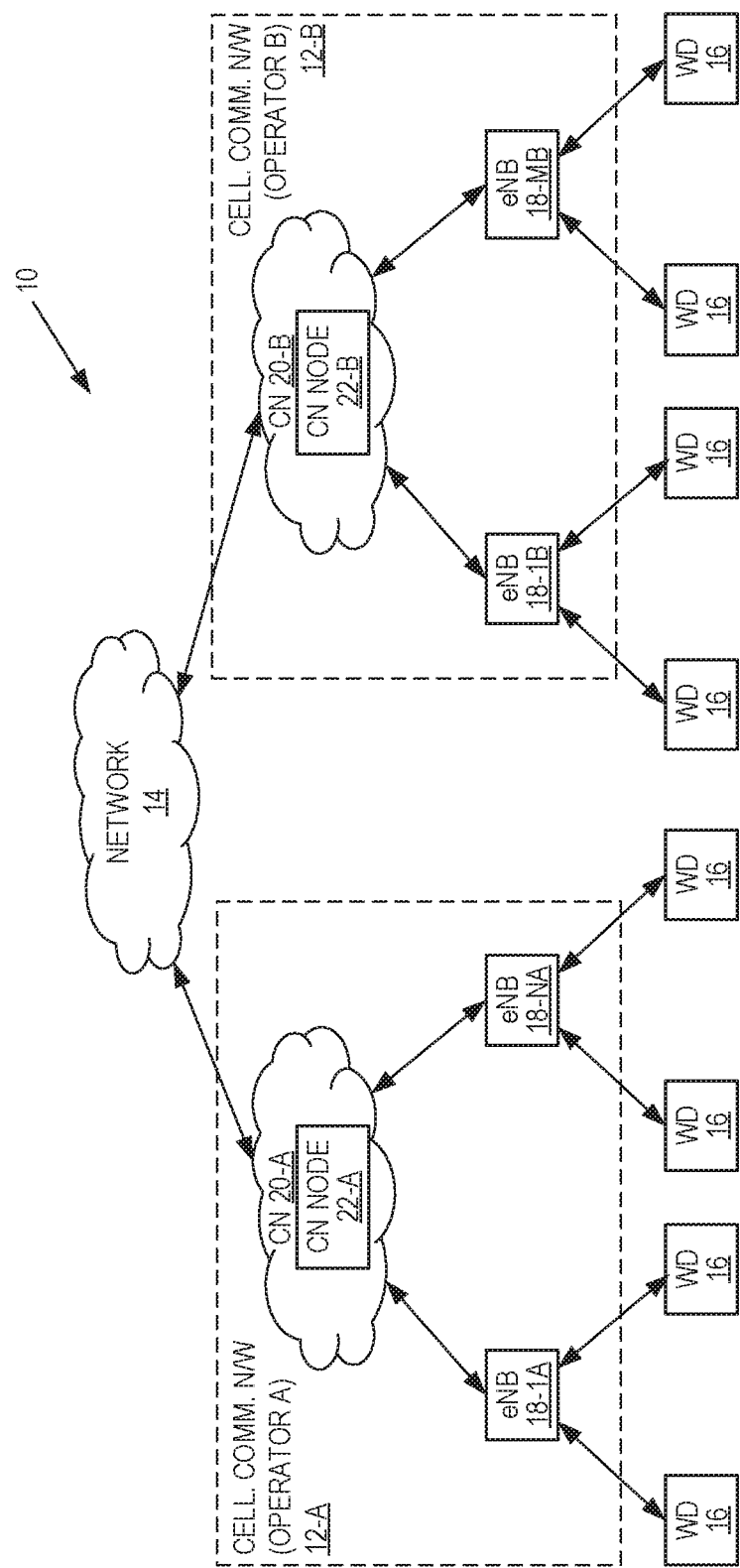
FIG. 1 illustrates a system in which one or more databases of interference related information are created, maintained, and used according to some embodiments of the present disclosure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The present disclosure relates to obtaining and storing interference related information and utilizing this information for various purposes (e.g., improved location-based Radio Resource Management (RRM), identifying dominant interferers for Coordinated Multi-Point (COMP) operation, etc.). As described below, the interference related information includes position-pair-dependent interference related information and/or node-dependent interference related information. As used herein, "position-pair-dependent interference related information" is information regarding (i.e., related to) interference caused by wireless transmissions originating at a first position of a pair of positions (which is referred to herein as a position pair) to wireless receptions at a second position of the pair of positions. Examples include, but are not limited to, path loss and/or receive power. Conversely, "node-dependent interference related information" is information regarding (i.e., related to) interference caused by wireless transmissions originating from a particular wireless device. Examples include, but are not limited to, transmit pattern information and/or receive pattern information, as described below.

As disclosed herein, a node can be understood as a physical node or as a virtual node comprising multiple distributed physical nodes. Furthermore, while the disclosure refers to position-pairs and node-pairs, concepts described herein can be applied or generalized to apply to position-clusters and node-clusters.

Before describing embodiments of the present disclosure, a brief discussion of some issues related to conventional technology is beneficial.

Multi-Standard Location-Based Radio Resource Management (RRM)

The concept of using the location of a wireless device to make appropriate multi-standard ARM decisions, such as load balancing or handover decisions, has existed for a while (see, for example, Matthias Hildebrand et al., "Location-based Radio Resource Management in Multi Standard Wireless Network Environments," Proceedings of the IST Mobile & Wireless Communications Summit, Thessaloniki, Greece, June 2002. pp. 458-462). This concept relies on the RRM function to be aware of the load, service, price, and coverage associated with cells possibly available to the wireless device at its present position. This implies, among other things, the existence of: (a) coverage maps detailing which fixed access nodes are potentially accessible from any given position and (b) the possibility to query the load and service cost of any access nodes.

Coordinated Multi-Point (CoMP)

With certain flavors of CoMP, performance can be improved if a priori knowledge about possible dominant interferers is available. For example, in joint reception, estimation of the interference plus noise covariance matrix is needed, and such estimation can often be enhanced by using a parametric approach which requires estimation of the matrix contribution associated with a specific interferer. Performing such estimation for a specific interferer requires identifying possible dominant interferers and then establishing whether this dominant interferer will be active during the time intervals of interest. Coordinated scheduling between access nodes can be used to facilitate the detection of the activity of dominant interferers. Once knowledge of the activity of a possible dominant interferer is established, certain RRM parameters or functions can be adapted to the knowledge of the activity (or non-activity) of this dominant interferer. This RAM adaptation needs time to "learn" the interference environment and, since interferers in the uplink are typically mobile wireless devices, the assignment of a dominant interferer tag to a wireless device for a given receiver can change with time.

Machine Type Communication (MTC) with Scheduled Applications

In the future, it is forecasted that many data transmissions within a cellular communications network will be associated with MTC devices. Clearly, many of those MTC devices will have a fixed location or will, at most, have a nomadic nature (i.e., a fixed location that is occasionally changed). Furthermore, some of those MTC devices have a predictable transmission/reception schedule and can therefore benefit from planned scheduling, which allows them to save power by remaining OFF until they need to be active.

Secondary User Cognitive Radio Operation in Television (TV) White Spaces Using a Geo-Location Spectrum Availability Database Associated with the Usage from Primary Users A "primary user" is considered herein a user who has higher priority or legacy rights on the usage of a specific part of the spectrum, while a "secondary user" is considered herein a user who has a lower priority and, therefore, exploits the spectrum in such a way that it does not cause interference to primary users.

It is possible for a user device to opportunistically use TV white space if an online database indicates that, at the present moment, primary users of that spectrum would not be affected by the opportunistic use of that spectrum by a secondary user at its present location (under certain constraints).

Network-Assisted Device Discovery for Device-to-Device (D2D) Communications

Discovering proximate devices before direct communication is one of the challenges in realizing D2D communication. Proximal discovery services integrated with existing device discovery is known (see, for example, Qualcomm, "Creating a Digital 6$^{th}$ Sense with LTE Direct," July 2014). Conventional network-assisted device discovery also covers the network specifying the scheduling of Transmit/Receive (TX/RX) patterns.

Current location-based RRM is centered around some knowledge (e.g., location, velocity, Quality of Service (QoS) requirements, and radio interface capabilities) associated with a wireless device (which is also referred to as a user device) that is establishing wireless communication and knowledge associated with one or more available wireless communications networks (e.g., load, services, Radio Access Technology (RAT), price, and coverage). However, an optimal RRM strategy is actually also dependent on characteristics associated with specific possible interfering wireless devices (e.g., active/inactive state, knowledge of their possible impact if they are active, etc.). Existing location-based RRM strategies do not consider knowledge of the characteristics of specific possible dominant interferers. The only input associated with interference is the load, which is a very useful input, but is not as useful as specifying dominant interferers and the impacts they would have if active. Basically, the existing location-based RRM strategies are based on the load (e.g., Physical Resource Block (PRB) utilization) in cells. Conversely, systems and methods are disclosed herein that enable a location-based RRM strategy that may consider location information but that is enhanced by information about possible mobile or stationary wireless devices (e.g., Machine Type Communication (MTC) devices) that can act as dominant interferers if active, and, in some embodiments, information about activity/non-activity (e.g., time/frequency) of those wireless devices.

In addition, current location-based RRM is reactive. In other words, current location-based RRM strategies make decisions based on what is observed (e.g., load in adjacent cells). The inventors have found that a proactive, or predictive, location-based RRM strategy would be an improvement over the conventional reactive location-based RRM strategies. A predictive location-based RRM strategy could, for example, be enabled for MTC devices where a database such that that described herein could serve as a basis for coordination of predictable transmissions of MTC devices. Thus, for example, transmissions from MTC devices could be orthogonalized, if possible. A database containing interference related information could be used to adapt to interference when such orthogonalization is not possible or is otherwise not desired.

Also, MTC communications will, in the future, be made over licensed, licensed-shared, and unlicensed spectrum. As such, coordination would need to be done not only for transmissions associated with a single operator, but also between operators. Using knowledge associated with possible dominant interferers will therefore become even more important because of the shared usage of the resources. It will no longer be about coordination between adjacent cells of an operator, but also between devices possibly almost co-located or between devices for which the near-far effect has not been managed. Also note that sharing of information, if provided at a very granular level (Transmit Time Interval (TTI)), enables RRM adaptation at the TTI level. But if the information shared is at a larger time scale (minutes, even hours), the sharing of information still allows coordination of MTC communications. This would result in coordinated application-level scheduling. The coordination would result in scheduling planning which would schedule transmissions on time/frequency/precoder/beam resources which would avoid unfavorable interference scenarios with other planned MTC communications. Such longer-term planning is clearly more appropriate for coordination among operators than coordination at a TTI level.

Current cognitive radio technology utilizes a database system that is tailored towards indicating spectrum availability based on the absence of interfered primary users, not towards speeding up RRM convergence. More specifically, current cognitive radio databases contain information about the time and position at which a secondary user can opportunistically use some spectrum or band without impacting the performance of primary users. This database is therefore "hard" (binary) in nature (i.e., a spectrum or band is or is not permitted to be used) and is used for admission control. Basically, it is a database centered on the possible presence of a primary user device consuming content provided by an active primary transmitter node. It does not facilitate any RRM functions besides admission control, and the database does not contain the relevant information to facilitate anything but admission.

With respect to network-assisted device discovery for Device-to-Device (D2D) communications, conventional network-assisted device discovery for D2D communications does not have the capability to predict path loss for a desired D2D link, or for possible interferers and interfered nodes. In addition, conventional network-assisted device discovery for D2D communications does not utilize information about transmit and receive scheduling patterns (e.g., discontinuous transmit/receive cycles) of devices that are in proximity to one another or possible dominant interferers. Adding these aspects can reduce the amount of collisions in the device discovery and in the subsequent control/data transmissions, which translates into faster network discovery, connection establishment, and data transfers.

In light of the discussion above, there is a need for systems and methods that, among other things, address at least some of the aforementioned issues with conventional location-based RRM, cognitive radio, and network-assisted device discovery for D2D communication. In this regard, systems and methods are disclosed herein that relate to building a database(s) of interference related information and utilizing the database(s) for various purposes (e.g., improved location-based RRM, enhanced cognitive radio, enhanced device discovery for D2D communication, identifying dominant interferers for CoMP operation, facilitating detection/reconstruction of interfering signal for interference cancelation, etc.). Again, as described below, the interference related information includes position-pair-dependent interference related information and/or node-dependent interference related information.

FIG. 1 illustrates a wireless system 10 that includes cellular communications networks 12-A and 12-B for, in this example, two different network operators (referred to herein as network operators A and B). The cellular communications networks 12-A and 12-B are, in this example, communicatively coupled via a network 14, which may be a private network or a public network (e.g., the Internet). The cellular communications networks 12A and 12-B provide cellular services (e.g., voice and data services) to wireless devices 16.

In some embodiments, the wireless devices 16 are or include stationary or semi-stationary wireless devices (e.g., MTC devices that have a fixed position or low mobility (e.g., move along a track in a manufacturing facility)). As used herein, a stationary wireless device is a wireless device that has a fixed position (i.e., does not move), whereas a semi-stationary wireless device is a wireless device that has substantially the same position (e.g., within the same building) when considering the coverage area of the cellular communications network 12-A, 12-B. In other embodiments, the wireless devices 16 are mobile wireless devices (e.g., smart phones or MTC devices having high mobility (e.g., a MTC device installed in an automobile)). In some other embodiments, the wireless devices 16 include both stationary or semi-stationary wireless devices and mobile wireless devices.

In this example, the cellular communications network 12-A includes a number of base stations 18-1A through 18-NA, which in 3$^{rd}$ Generation Partnership Project (3GPP) Long Term Evolution (LTE) terminology are enhanced or evolved Node Bs (eNBs), that provide radio access to the wireless devices 16 in the cellular communications network 12-A. The base stations 18-1A through 18-NA are generally referred to herein collectively as base stations 18 and individually as base station 18. Here, "N" is the number of base stations 18 in the cellular communications network 12-A. Further, in the event that a base station 18 of the cellular communications network 12-A is to be distinguished from a base station 18 of the cellular communications network 12-B, the base station 18 will be referred to as a base station 18 "of the cellular communications network 12-A." The base stations 18 of the cellular communications network 12-A are communicatively coupled to a core network 20-A of the cellular communications network 12-A. The core network 20-A includes a number of core network nodes 22-A such as, for example, Serving Gateways (S-GWs), Packet Data Network (PDN) Gateways (P-GWs), Mobility Management Entities (MMEs), etc.

In a similar manner, the cellular communications network 12-B includes a number of base stations 18-1B through 18-MB, which in 3GPP LTE terminology are eNBs, that provide radio access to the wireless devices 16 in the cellular communications network 12-B. The base stations 18-1B through 18-MB are generally referred to herein collectively as base stations 18 and individually as base station 18. Here, "M" is the number of base stations 18 in the cellular communications network 12-B. Further, in the event that a base station 18 of the cellular communications network 12-B is to be distinguished from a base station 18 of the cellular communications network 12-A, the base station 18 will be referred to as a base station 18 "of the cellular communications network 12-B." The base stations 18 of the cellular communications network 12-B are communicatively coupled to a core network 20-B of the cellular communications network 12-B. The core network 20-B includes a number of core network nodes 22-B such as, for example, S-GWs, P-GWs, MMES, etc.

As discussed below, some node or combination of nodes in the cellular communications network 12-A and/or 12-B operates to build a database(s) of position-pair-dependent interference related information for at least some position pairs and/or node-dependent interference related information for the wireless devices 16 or some subset thereof. In general, the database(s) stores position-pair-dependent interference related information (e.g., path loss or receive power) for multiple pairs of positions, which are also referred to herein as position pairs. Each position pair includes a first position and a second position, where each position may be:
  an absolute position, e.g.,
    a position in a discretization of two-dimensional or three-dimensional space which may be in the form of, e.g.,
      latitude and longitude coordinates such as those provided by a Global Positioning System (GPS) receiver,
      a grid location in a two-dimensional or three-dimensional grid, where the grid may be, e.g., a square grid (i.e., a grid where each grid location is a square), a cubic grid (i.e., a grid where each grid location is a cube), a hexahedron grid (i.e., a grid where each grid location is a hexahedron), or the like,
  a relative position (i.e., a position relative to a reference point), e.g.,
    a distance and direction from a reference point (e.g., a base station 18), where distance may be represented as a true distance (e.g., a distance in meters) or as some value that is related to the true distance (e.g., received signal strength),
  a node Identifier (ID) in a scenario where a corresponding wireless device 16 is a stationary or semi-stationary wireless device such that the node ID represents a position of the wireless device, or
  any other information that represents a position.

The position-pair-dependent interference related information stored in the database(s) for each position pair includes information (e.g., path loss or receive power) regarding (i.e., relating to) interference caused by wireless transmissions from the first position in the position pair to wireless receptions at the second position in the position pair. The position-pair-dependent interference related information for a position pair may be, e.g., predicted using a model (e.g., a path loss model such as the Okumura-Hata path loss model or a ray-tracing propagation model), obtained from a historical database of position-pair-dependent interference related information (e.g., a historical database of, e.g., path loss measurements or receive power measurements for a path loss between wireless devices 16 positioned at the first and second positions of the position pair), obtained by passive measurement (i.e., passively observing and using appropriate measurements made for other purposes), and/or obtained by active measurement (i.e., actively causing the desired measurements for the desired position pairs and, potentially, actively initiating transmissions used for the desired measurements).

In addition to storing position-pair-dependent interference related information for the position pairs, the database(s) stores, at least in some embodiments, node-dependent interference related information for each of the wireless devices 16 or at least for a subset of the wireless devices 16 (e.g., only MTC devices or only stationary or semi-stationary MTC devices). The node-dependent interference related information includes Receive (RX) pattern information and/or Transmit (TX) pattern information.

For a particular wireless device 16, the RX pattern information includes one or more time periods (e.g., subframes) in which the wireless device 16 will be receiving (i.e., is expected to or predicted to be receiving) wireless transmissions. In addition, in some embodiments, the RX pattern information includes frequency resources (e.g., frequency band(s), subcarrier(s), or the like) or other detection space (e.g., other dimensions that can be used to differentiate transmitted signals such as, e.g., polarization, direct sequence spreading code, frequency hopping pattern, or the like) on which the wireless device 16 will be receiving during the one or more time periods. Still further, in some embodiments, the RX pattern information for the wireless device 16 includes one or more beam patterns (where the beam pattern(s) may be modified through mechanical, electronic, or hybrid mechanical/electronic steering means) in which the wireless device 16 will be receiving during the one or more time periods. Note that, as used herein, the term "beam pattern" is defined as at least one or more of beam attributes such as direction, beam strength, beam geometry and the like. Thus, the RX pattern information may also include information associated with the receive beam strength and/or configuration instead or in addition to the direction such as, e.g., the 3 Decibel (dB) beamwidth of the receive beam and/or an angularly quantized description of the receive beam. The time periods, the frequency resources, and the beam patterns may be known based on, e.g., downlink scheduling information for the wireless device 16 or predicted, e.g., based on past activity of the wireless device 16. Lastly, in some embodiments, the RX pattern information for the wireless device 16 also includes one or more noise floors predicted for the wireless device 16 for the one or more time periods (e.g., on the frequency resource(s) and in the direction(s) to be received). The noise floor information may be particularly beneficial where interference may be received at the wireless device 16 due to transmissions or emissions from other types of devices (e.g., microwave ovens, Wi-Fi access points in embodiments where the cellular communications network 12-A or 12-B supports operation in an unlicensed frequency band, or the like).

In a similar manner, for a particular wireless device 16, the TX pattern information includes one or more time periods (e.g., subframes) in which the wireless device 16 will be transmitting (i.e., is expected to predicted to be receiving) wireless transmissions. The TX pattern information may also include an expected transmit power level for the one or more time periods in which the wireless device 16 will be transmitting. In addition, the TX pattern information includes frequency resources (e.g., frequency band(s), subcarrier(s), or the like) or other detection space on which the wireless device 16 will be transmitting during the one or more time periods. Still further, in some embodiments, the TX pattern information for the wireless device 16 includes one or more beam patterns (where the beam pattern(s) may be modified through mechanical, electronic (e.g. precoder), or hybrid/mechanical electronic steering means) in which the wireless device 16 will be transmitting during the one or more time periods. Again, the term "beam pattern" is defined as at least one or more of beam attributes such as direction, beam strength, beam geometry and the like. Thus, the TX pattern information may also include information associated with the transmit beam strength and/or configuration instead or in addition to the direction such as, e.g., the 3 dB beamwidth of the transmit beam and/or an angularly quantized description of the transmit beam. The TX pattern information may also include other information such as, e.g., information indicating the RAT used for transmission, the Modulation and Coding Scheme (MCS) used for transmission (which can be useful, for example, for interference cancellation). The time periods, the transmit power levels, the frequency resources, and the beam patterns may be known based on, e.g., downlink scheduling information for the wireless device 16 or predicted, e.g., based on past activity of the wireless device 16.

The database(s) are used by nodes in the cellular communications networks 12-A and 12-B (e.g., the base stations 18) and/or by the wireless devices 16 to provide improved operation of both of the cellular communications networks 12-A and 12-B or for each of the cellular communications networks 12-A and 12-B. For example, the database(s) may be used to provide improved location-based RRM (e.g. attempts to orthogonalize resource assignment for the RX of a user strongly interfered by a given transmitter), improved CoMP (e.g., via the identification of dominant interferers), improved cognitive radio (awareness not only of the usage patterns of primary users, but also of the possible impact of the secondary user on the primary users; also enables better coordination among secondary users with predictable patterns), improved device discovery for D2D communication, or the like, or any combination thereof. As an example of improved location-based RRM in a multi-layer radio access network (each layer usually corresponds to one carrier frequency and has different coverage area from other layers), the knowledge of position information, mobility prediction, and inference environment of a wireless device as stored and/or derived from the database helps to make RRM decision more efficiently, more timely and more accurately. As another example, the database(s) may be used to facilitate detection and/or reconstruction of interfering signals for interference cancellation.

Figure 2:
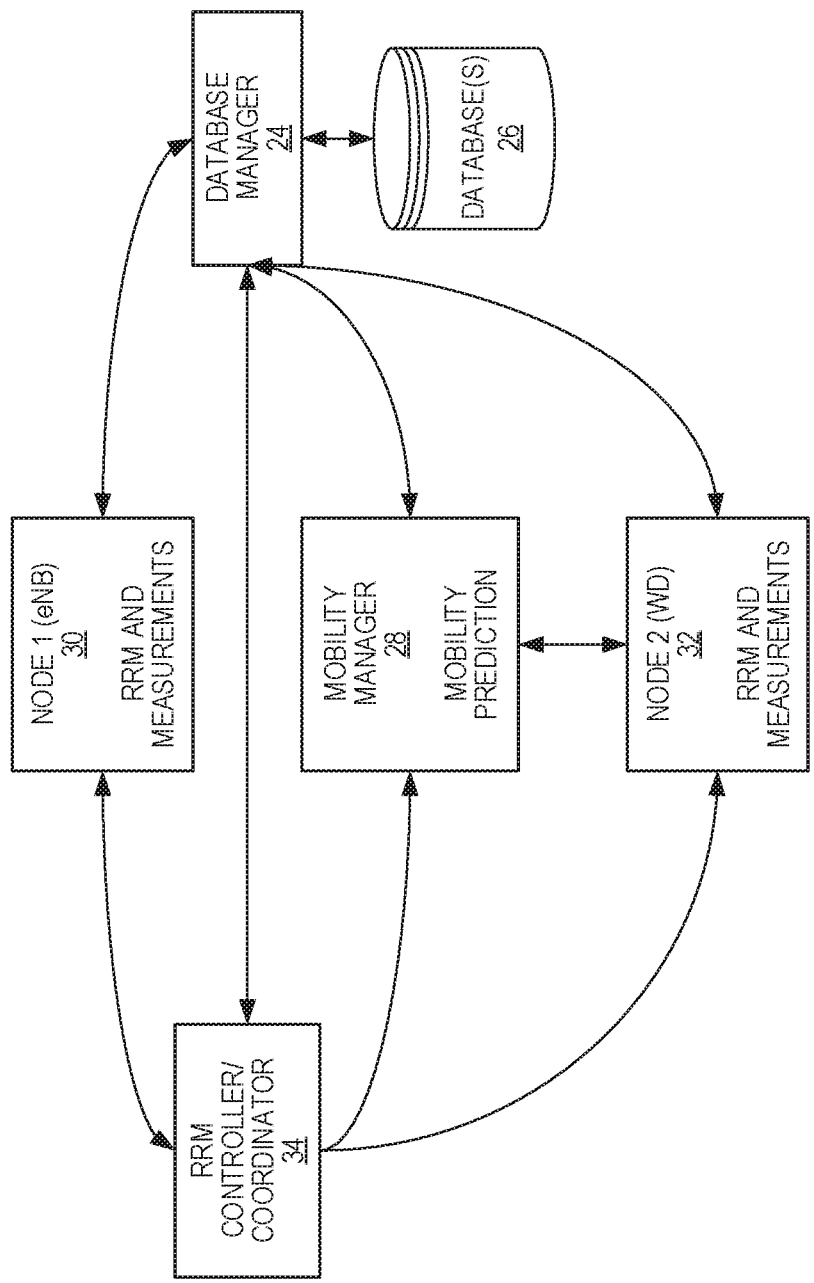
FIG. 2 illustrates a number of components of a system for creating, maintaining, and using the one or more databases of interference related information according to some embodiments of the present disclosure.

FIG. 2 is a block diagram that illustrates various physical and functional components implemented in the wireless system 10 to build and use the aforementioned database(s) according to some embodiments of the present disclosure. As illustrated, the components include a database manager 24 that operates to build (e.g., create and maintain) database(s) 26 storing the position-pair-dependent interference related information and, in some embodiments, the node-dependent interference related information for the wireless devices 16, as described above. The database manager 24 may be implemented as software that executes in any suitable node or combination of nodes in the cellular communications network 12-A or 12-B or as a new node having its own hardware and software. For example, the database manager 24 may be implemented as software that executes on a core network node 22-A or 22-B or in a node in the radio access network of the cellular communications network 12-A or 12-B. The database(s) 26 may be centralized or distributed, depending on the particular implementation.

In addition, the components include, at least in some embodiments, a mobility manager 28. The mobility manager 28 may be implemented as software that executes in any suitable node or combination of nodes in the cellular communications network 12-A or 12-B or as a new node having its own hardware and software. For example, the mobility manager 28 may be implemented as software that executes on a core network node 22-A or 22-B or in a node in the radio access network of the cellular communications network 12-A or 12-B. As discussed below, the mobility manager 28 operates to, in some embodiments, predict positions, or locations, of at least some of the wireless devices 16, where the predicted positions are used together with the database(s) 26 to obtain position-pair-dependent interference related information and, in some embodiments, node-dependent interference related information for, e.g., a receive node (i.e., one of the wireless devices 16 that will be receiving at a future time (T)) and one or more transmit nodes (i.e., one or more other wireless devices 16 that will be transmitting at the future time (T)) that will interfere with reception at the receive node. The mobility manager 28 may not be included in embodiments where the database(s) 26 stores information for only stationary or semi-stations wireless devices.

The position-pair-dependent interference related information and the node-dependent interference related information stored in the database(s) 26 may be obtained from various nodes 30 and 32. In particular, in some embodiments, the node 30 is a base station 18 and the node 32 is a wireless device 16, and the database manager 24 receives measurements (e.g., receive power measurements, path loss measurements, or measurements serving as the basis for path loss measurements) from the node 30 and/or the node 32. These measurements may, in some embodiments, be actively coordinated by a RRM controller/coordinator 34 in order to obtain the position-pair-dependent interference related information for desired position pairs. The RRM manager 34 is, in some embodiments, implemented as software that executes on a node (e.g., a wireless device 16, a base station 18, or a core network node 22).

Note that FIG. 2 illustrates the interactions between functional components according to some embodiments of the present disclosure. These functional components may be centralized at a single node or distributed across two or more nodes. Also note that a direct functional link indicated by an arrow in FIG. 2 does not mean that a direct physical link exists between nodes in which the corresponding functional components are implemented. As an example, if the node 32 is one of the wireless devices 16, then a physical link to the node 32 would need to transit through a base station 18, which may be the node 30.

Figure 3A:
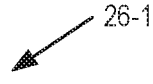
FIGS. 3A and 3B illustrate examples of the databases of interference related information according to some embodiments of the present disclosure.
Figure 3B:

FIGS. 3A and 3B illustrate two example databases 26 that are maintained by the database manager 24 according to some embodiments of the present disclosure. FIG. 3A illustrates a first database 26-1 that stores position-pair-dependent interference related information, which in this example is path loss, for a number of different position pairs. Each position pair includes a first position (Position 1) and a second position (Position 2), where the first position is the position of the source of the interference (i.e., the TX position) and the second position is the position of the recipient of the interference (i.e., the RX position). In other words, the first position is the position from which wireless transmissions originate, and the second position is the position at which those wireless transmissions cause interference. In this example, the path loss is the path loss of the wireless communication channel between the first and second positions and is an indicator of the level of interference seen at the second position a result of wireless transmissions originating in the first position. A high path loss is indicative of a low interference level, whereas a low path loss is indicative of a high interference level. Note that the positions are shown as "A," "B," "C," "D," etc. in FIG. 3A. However, these letters are given as general representations of any type of position information (e.g., an absolute position, a relative position, a node ID, or any other position information, as described above). Also note that the database 26-1 may not store position-pair-dependent interference related information for all possible position pairs in the wireless system 10. For example, the database 26-1 may store position-pair-dependent interference related information only for those position pairs for which, in this example, the path loss is less than a predefined threshold. FIG. 3B illustrates a database 26-2 that stores node-dependent interference related information for a number of wireless devices 16. In this example, the node-dependent interference related information includes TX pattern information and RX pattern information for the respective wireless devices 16. The illustrated TX pattern information and RX pattern information is only an example.

As described herein, using the database 26-1, a node associated with the cellular communications network 12-A or 12-B can obtain position-pair-dependent interference related information for a RX node of interest by querying the database 26-1 for the entries in which a known position of the RX node (e.g., if the RX node is a stationary or semi-stationary wireless device 16) or a predicted future position of the RX node (e.g., if the RX node is a mobile wireless device 16) is "Position 2" (i.e., the RX position). Then, using the corresponding position-pair-dependent interference related information (e.g., path loss), the node can identify which TX positions will result in the highest level of interference (e.g., an interference level that is greater than a predefined threshold). The identified TX positions can then be used together with known positions of TX nodes (e.g., if the TX nodes are stationary or semi-stationary wireless devices 16) or predicted future locations of TX nodes (e.g., if the TX nodes are mobile wireless devices 16) to identify TX nodes that are potential interferers for the RX node. The RX node is referred to as an interfered node, and the TX nodes are referred to as interfering nodes. Each combination of the RX node (as the interfered node) and an identified TX node (as the interfering node) is referred to as an interfered node and interfering node pair. The database 26-2 can then be used to obtain the node-dependent interference related information (e.g., TX pattern information for the TX nodes (interfering nodes) and, if needed, the RX pattern information for the RX node) to determine whether actual interference between the TX node and the RX node is predicted (i.e., likely to occur). For example, the TX pattern of a particular TX node (interfering node) and the RX pattern of the RX node (interfered node) may be such that transmissions from the TX node will not cause interference to the RX node even though the path loss is low (e.g., due to the use of different time, frequency, and/or space resources).

Figure 4:
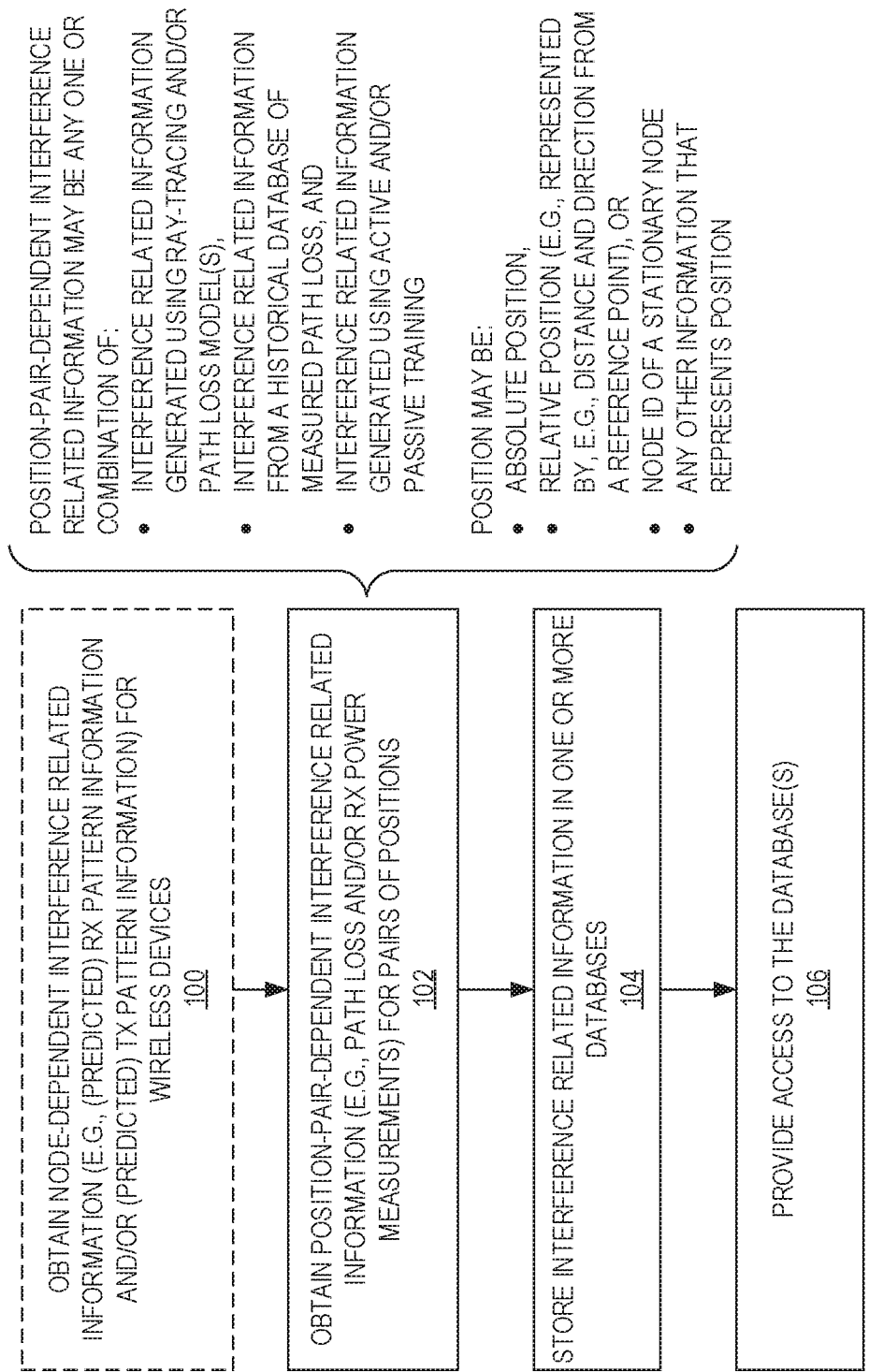
FIG. 4 illustrates the operation of the database manager of FIG. 2 according to some embodiments of the present disclosure.

FIG. 4 is a flow chart that illustrates the operation of the database manager 24 according to some embodiments of the present disclosure. The database manager 24 may be a node in or otherwise associated with the cellular communications network 12-A or 12-B or implemented as software executing on an existing node (e.g., a core network node 22) that is in or otherwise associated with the cellular communications network 12-A or 12-B. Note that while the term "steps" is used with respect to FIG. 4 and other figures in this disclosure, the so-called "steps" may be performed in any desired order or some steps may even be performed in parallel unless otherwise explicitly stated herein or otherwise required.

As illustrated, in some embodiments, the database manager 24 obtains node-dependent interference related information for the wireless devices 16 or some subset of the wireless devices 16 (step 100). Note that step 100 is optional as indicated by the dashed lines. The database manager 24 may obtain the node-dependent interference related information from any appropriate nodes in the cellular communications networks 12-A and 12-B. For example, the database manager 24 may obtain the TX pattern information and/or the RX pattern information from the base stations 18. More specifically, the base stations 18 may schedule uplink and downlink transmissions for the wireless devices 16. The scheduled uplink and downlink parameters (e.g., uplink TX power, uplink resource grant, etc. for the uplink, and downlink resource grant, etc. for the downlink) may be requested from the base stations 18 or proactively provided from the base stations 18 to the database manager 24. The node-dependent interference related information may additionally or alternatively be obtained by predicting the node-dependent interference related information or some portion thereof based on past activity of the wireless devices 16. For example, if a particular wireless device 16 has historically transmitted once every X milliseconds, then this historical information may be used to predict one or more future time windows in which the wireless device 16 is predicted to transmit.

In some embodiments, the database manager 24 polls the wireless devices 16 or some subset thereof requesting that the wireless devices 16 report their TX scheduling information (e.g., time, frequency, precoder/beam/space, and/or power resources) and/or their RX scheduling information (e.g., time, frequency, and/or precoder/beam/space resources) and/or the RX power level over the RX resources (e.g., time and frequency). Based on the information feedback from the wireless devices 16, the database manager 24 can obtain any desired/relevant TX and/or RX pattern information for the wireless devices 16. Note that the RX pattern is of interest because interference may not be an issue if a RX node is not receiving on the same resources. Note that different TX and/or RX pattern information may be obtained (and stored) for different resources (e.g., different time, frequency, and/or channel resources) so that, e.g., it would be possible to store different TX and/or RX (e.g., Discontinuous Reception (DRX)) pattern information for a control channel and a data channel associated with the same TX/RX node.

The database manager 24 obtains position-pair-dependent interference related information (e.g., path loss and/or RX power measurements) for pairs of positions (i.e., position pairs) (step 102). Again, each position may be an absolute position, a relative position, a node ID (e.g., in the case of a stationary or semi-stationary wireless device 16). In some embodiments, the database manager 24 generates the position-pair-dependent interference related information, e.g., based on measurements received from another node(s) (e.g., based on RX power measurements and corresponding TX power values obtained from, e.g., the wireless devices 16 and/or the base stations 18). In other embodiments, the position-pair-dependent interference related information is generated by another node(s) (e.g., the base stations 18), and the database manager 24 obtains the position-pair-dependent interference related information from that other node(s).

The position-pair-dependent interference related information for the position pairs may be determined using any suitable technique or combination of techniques. For example, in some embodiments, path loss values between different position pairs may be, e.g., predicted using a ray-tracing propagation model and/or a path loss model (e.g., an Okumura-Hata path loss model), determined based on a historical database of measurements (e.g., path loss measurements and/or RX power measurements) for different positions, and/or determined via active and/or passive training.

Active training refers to a technique in which the database manager 24, e.g., through the RRM controller/coordinator 34, actively coordinates measurements (e.g., path loss measurements, measurements used to compute path loss, or RX power measurements) for pairs of wireless devices 16 at desired position pairs. For example, the mobility manager 28 may predict location, or position, versus time paths for the wireless devices 16 or some subset thereof. Using the predicted positions of the wireless devices 16, the database manager 24 can then identify wireless devices 16 that will be located at position pairs for which position-pair-dependent interference related information is desired. The database manager 24 may then, though the RRM controller/coordinator 34, instruct those wireless devices 16 to perform and report the desired measurements, which are then stored as or used to compute the position-pair-dependent interference related information for the respective position pairs. Notably, in some embodiments, wireless devices 16 other than those corresponding to the TX position and the RX position for a desired position pair may be controlled (e.g., muted) so that these other wireless devices 16 do not negatively impact the measurements for the position-pair-dependent interference related information. In other words, the database manager 24 may (e.g., through the RRM controller/coordinator 34) activate and deactivate different subsets of the wireless devices 34 in order to obtain measurements for different position pairs.

Conversely, passive training refers to a technique that is similar to active training but where the wireless devices 16 are not instructed to perform measurements for the purpose of obtaining the position-pair-dependent interference related information for desired position pairs. Rather, existing measurements (i.e., measurements that are for other purposes) are used together with the predicted positions of the wireless devices 16 and scheduling information for the wireless devices 16 to passively obtain the position-pair-dependent interference related information for respective position pairs.

The database manager 24 stores the position-pair-dependent interference related information for the respective position pairs and, in some embodiments, the node-dependent interference related information for the respective wireless devices 16 in the database(s) 26 (step 104). Notably, steps 100-104 are preferably repeated to update the database(s) 26 as desired. For example, the database manager 24 may obtain and store the position-pair-dependent interference related information when initial interference related information for a position pair is needed or when a change in the interfering environment for the position pair is detected. As such, change detection could happen in other functional components. As an example, for a position pair that corresponds to a pair of stationary wireless devices 16, a change in the interfering environment for the position pair could be detected at either of the stationary wireless devices 16 by mobility sensors if the stationary wireless device 16 is relocated. Similarly, the node-dependent interference related information for either of the stationary wireless devices 16 may be updated in response to detection of a change in planned TX and/or RX scheduling for that stationary wireless device 16. A change could also be detected if certain Key Performance Indicators (KPIs) are degrading, or certain measurements are deviating too much, possibly indicating that the assumed interference environment has changed.

Note that the database manager 24 could be devised to be relatively smart about which information can be reused when populating/updating the database(s) 26. For example, if a path loss is computed for position pair, symmetry could be used in a Time Division Duplexing (TDD) system to populate the path loss entry for the reciprocal position pair. It could also sometimes be possible to find a proper mapping between the average path loss of the position pair at a given frequency, and the same position pair at another frequency, in the same or opposite TX/RX direction.

The database manager 24 provides access to the database(s) 26 (step 106). For example, nodes in or otherwise associated with the cellular communications networks 12-A and 12-B (e.g., the wireless devices 16 and/or the base stations 18) may query the database(s) 26 to obtain position-pair-dependent interference related information for, e.g., a desired RX node and, in some embodiments, obtain node-dependent interference related information for, e.g., TX nodes that may be a source of interference to the desired RX node.

In some embodiments, the RRM controller/coordinator 34 operates to coordinate the usage of the database(s) 26. More specifically, since the database(s) 26 can be useful to the RRM/estimation/prediction functions in various nodes (e.g., in various wireless devices 16 and/or base stations 18), the RRM controller/coordinator 34 operates to, in some embodiments, instruct the various nodes and the database manager 24 about which nodes require which information from the database(s) 26. The database manager 24 may then, in some embodiments, coordinate decentralization of the database information. To do so, the database manager 24 is made aware of the latency between nodes, so that any needed information duplication and synchronization is properly managed. If the database(s) 26 is decentralized (distributed), the database manager 24 also indicates to the nodes the location of any relevant database information, both for reporting of information associated with the database construction and for the access of the relevant needed database entries. In practice, the database manager 24 may replicate to all nodes the part of the information which is relevant to that node.

Figure 5:
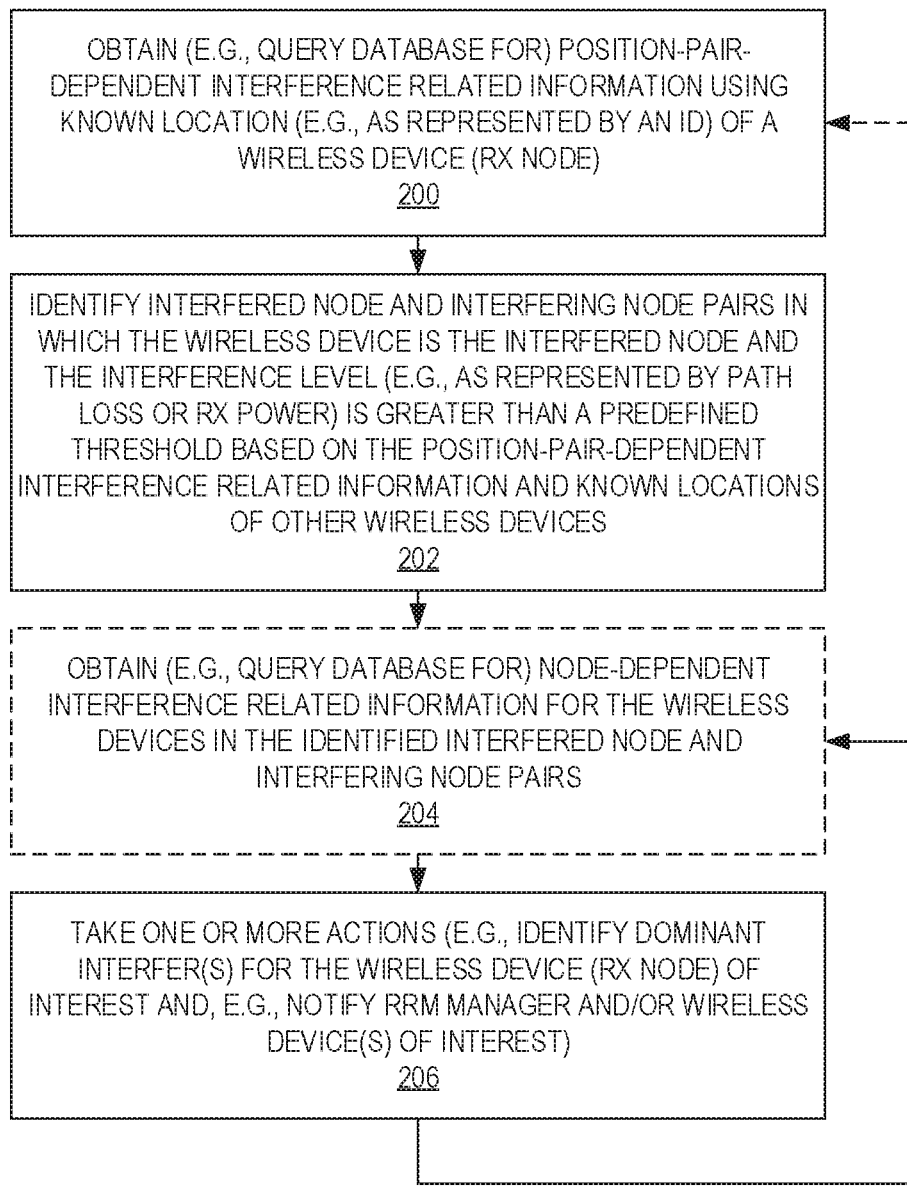
FIG. 5 illustrates the operation of a network node to obtain information from the one or more databases and to use that information according to some embodiments of the present disclosure.

FIG. 5 illustrates the operation of a node to obtain and use information from the database(s) 26 according to some embodiments of the present disclosure. In this embodiment, the database(s) 26 stores position-pair-dependent interference related information for pairs of stationary or semi-stationary wireless devices 16 and, optionally, node-dependent interference related information for those wireless devices 16. In other words, the position pairs for which the position-pair-dependent interference related information is stored correspond to positions of stationary or semi-stationary wireless devices 16. In some embodiments, the positions are represented as node IDs of the respective stationary or semi-stationary wireless devices 16.

As illustrated, the node obtains position-pair-dependent interference related information for a known location of a wireless device 16 from the database(s) 26 (step 200). The node performing the process of FIG. 5 may be, e.g., the wireless device 16 or the base station 18 serving the wireless device 16. The node obtains the position-pair-dependent interference related information by querying the database(s) 26 using the known location, or position, of the wireless device 16. For a stationary or semi-stationary wireless device 16, the position may be represented as a node ID of the wireless device 16. The position-pair-dependent interference related information obtained from the database(s) 26 includes the interference related information for the position pairs in which the position of the wireless device 16 (e.g., as represented by the node ID of the wireless device 16) is the RX position (e.g., the second position in the example of FIG. 3A). In addition to the position-pair-dependent interference related information, the database(s) 26 returns the TX positions (e.g., the first positions in the example of FIG. 3A) for the respective position pairs. Using FIG. 3A as an example, if the position of the wireless device 16 is "C," then the position-pair-dependent interference related information obtained includes the path loss values for position pairs A,C and B,C. In addition, the respective TX positions "A" and "B" are communicated along with the respective path loss values.

The node identifies one or more interfered node and interfering node pairs in which the wireless device 16 is the interfered node and the interference level is greater than a predefined threshold based on the position-pair-dependent interference related information obtained for the known location, or position, of the wireless device 16 and known locations, or positions, of other wireless devices 16 (step 202). More specifically, using the position-pair-dependent interference related information obtained for the known position of the wireless device 16, the node is able to determine the TX positions for the position pairs for which the position-pair-dependent interference related information indicates an interference level that is greater than a predefined threshold (e.g., a path loss value that is less than a predefined value indicates a high interference level). Then, the TX positions can be correlated to the corresponding wireless devices 16 that have known locations, or positions, that correspond to those TX positions. In this manner, the interfered node (i.e., the RX node) and the interfering node (i.e., the TX node) pairs are identified. To be clear, in this example, the wireless device 16 for which the position-pair-dependent interference related information is obtained is the interfered node in all of the interfered node and interfering node pairs.

Optionally (as indicated by the dashed lines), the node also obtains node-dependent interference related information for the wireless devices 16 in the identified interfered node and interfering node pairs (step 204). For example, the node may query the database(s) 26 to obtain the TX pattern information for the interfering nodes (i.e., the TX nodes) in the identified interfered node and interfering node pairs and/or obtain the RX pattern information for the interfered node (i.e., the RX node) in the identified interfered node and interfering node pairs.

The node then takes one or more actions based on the identified interfered node and interfering node pair(s) and, optionally, the node-dependent interference related information obtained for the respective wireless devices 16 (step 206). For example, using the position-pair-dependent interference related information for the interfered node and interfering node pairs and the node-dependent interference related information for wireless devices 16 in the interfered node and interfering node pairs, the node may identify one of the interfering nodes as a dominant interferer of the interfered node. The node may then notify, e.g., the wireless device 16 (i.e., the interfered node) and/or the base station 18 serving the wireless device 16 of the dominant interferer. Based on this knowledge, appropriate techniques can be used to, e.g., mitigate the interference to the wireless device 16 caused by the dominant interferer, reconstruct a signal for interference cancellation, perform interference rejection combining, or the like.

Figure 6:
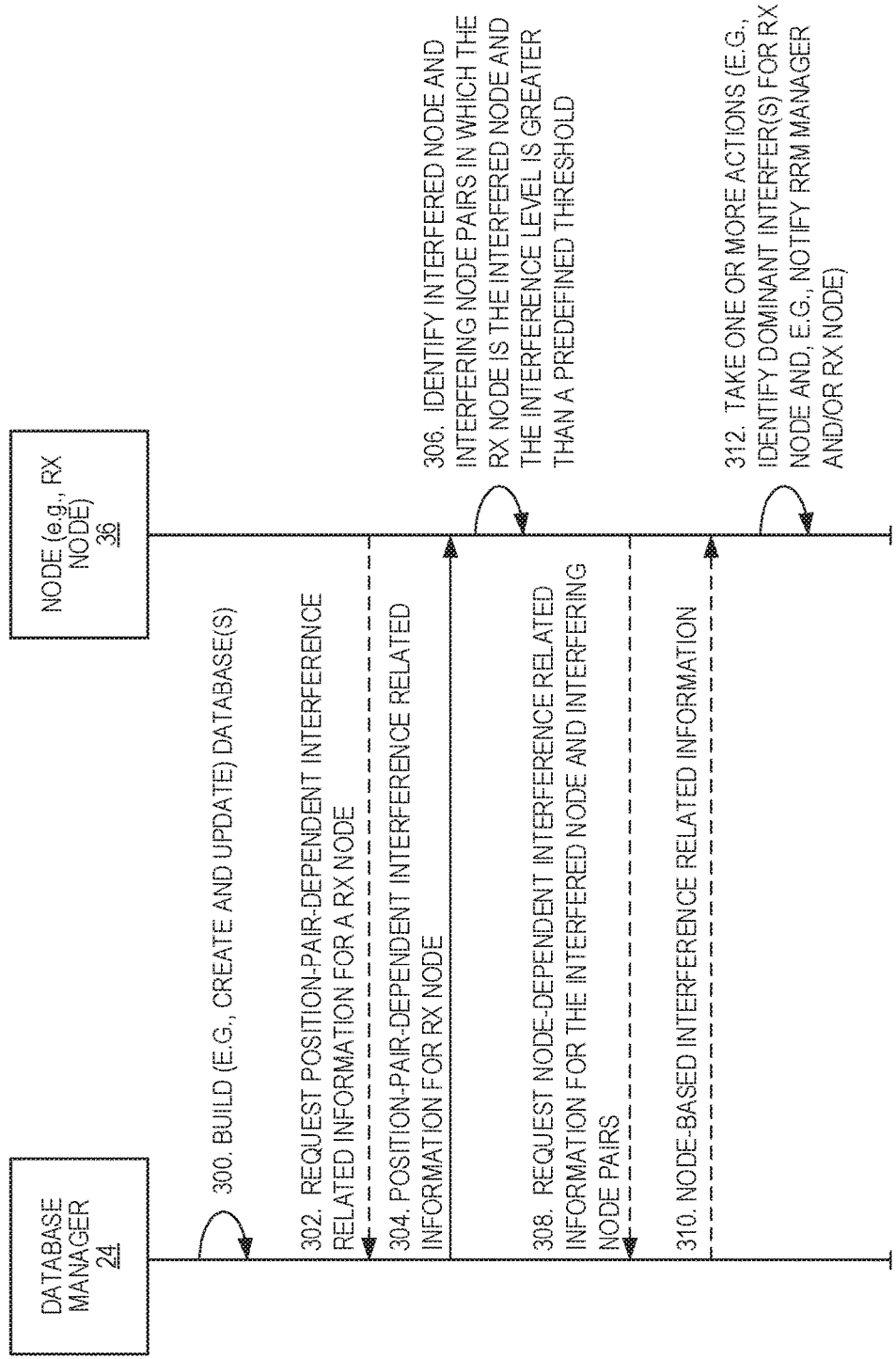
FIG. 6 illustrates the operation of the database manager and a node that obtains information from the one or more databases via the database manager and uses the information according to some embodiments of the present disclosure.

FIG. 6 is a communication flow diagram that illustrates the operation of various nodes in connection with the processes of FIGS. 4 and 5 according to some embodiments of the present disclosure. As illustrated, the database manager 24 builds the database(s) 26, as described above with respect to FIG. 4 (step 300). Optionally, a node 36 requests position-pair-dependent interference related information for a RX node of interest (step 302). More specifically, the node 36 requests position-pair-dependent interference related information for a position of the RX node of interest. The database manager 24 sends position-pair-dependent interference related information for the RX node of interest to the node 36 (step 304). If the position-pair-dependent interference related information is provided in response to the request of step 302, then the position-pair-dependent interference related information may be limited to the position-pair-dependent interference related information for the position pairs in which the known position of the RX node of interest is the RX position. However, in other embodiments, the position-pair-dependent interference related information is proactively pushed to the node 36. In this case, the position-pair-dependent interference related information may include position-pair-dependent interference related information for position pairs including but not necessarily limited to position pairs in which the known position of the RX node is the RX position.

Using the position-pair-dependent interference related information, the node 36 identifies one or more interfered node and interfering node pairs in which the RX node of interest is the interfered node and the interference level is greater than a predefined threshold, as described above with respect to step 202 of FIG. 5 (step 306). Optionally, the node 36 requests and receives node-dependent interference related information for the wireless devices 16 in the identified interfered node and interfering node pairs, as described above with respect to step 204 of FIG. 5 (steps 308 and 310). The node 36 then takes one or more actions based on the identified interfered node and interfering node pair(s) and, optionally, the node-dependent interference related information for the respective wireless devices 16, as described above with respect to step 206 of FIG. 5 (step 312).

Figure 7:
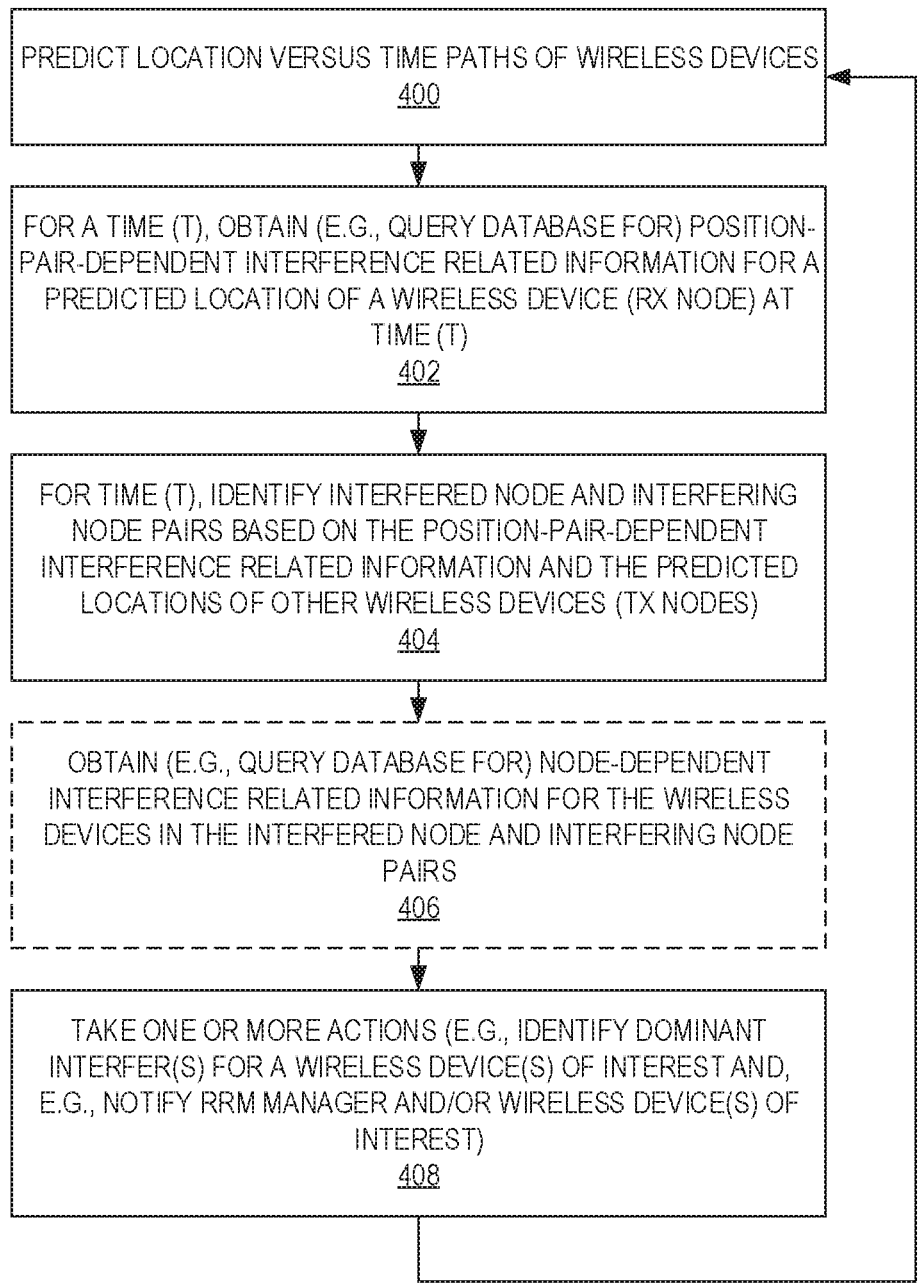
FIG. 7 illustrates the operation of the mobility manager of FIG. 2 according to some embodiments of the present disclosure.
Figure 8:
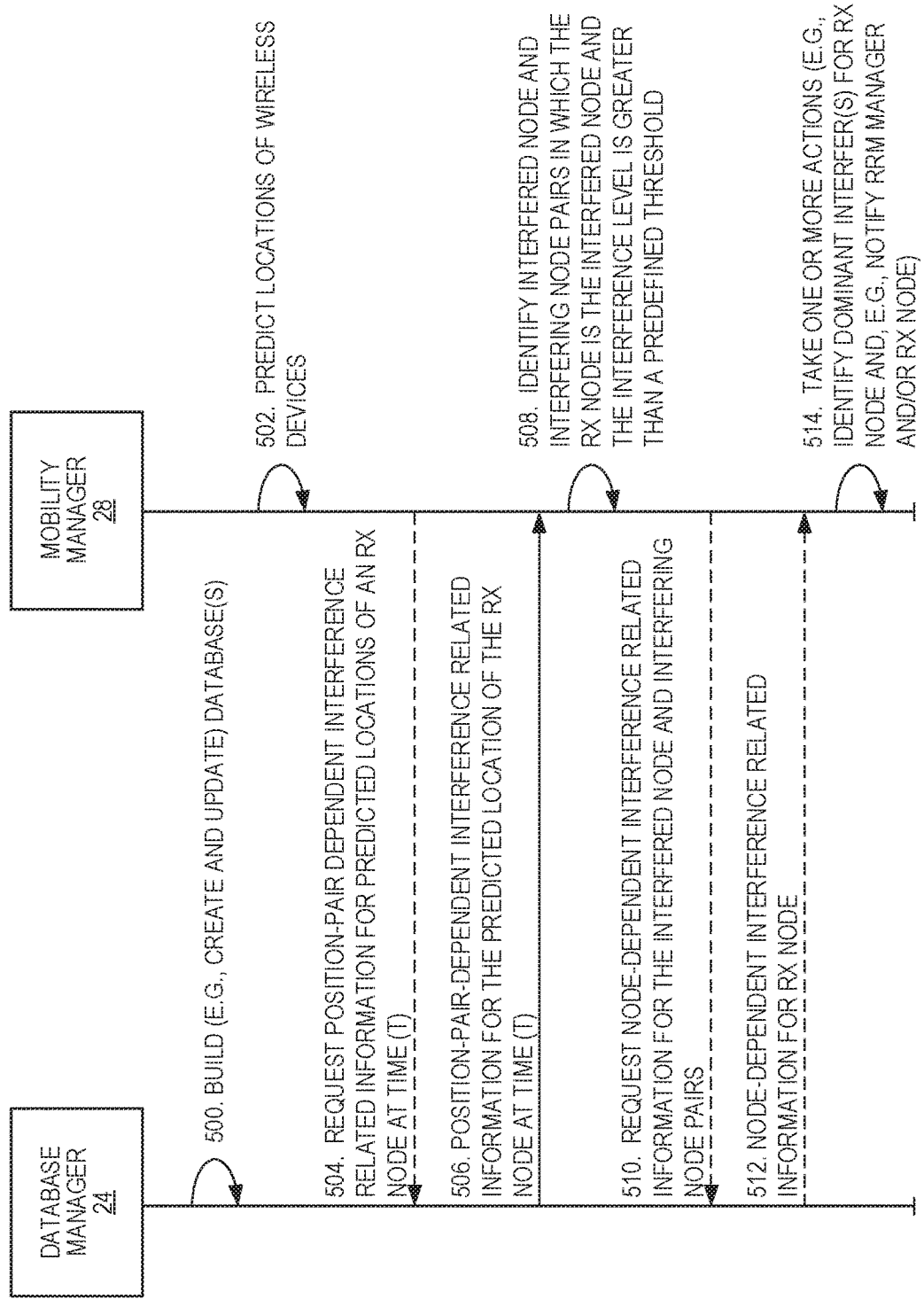
FIG. 8 illustrates the operation of the database manager and the mobility manager that obtains information from the one or more databases via the database manager and uses the information according to some embodiments of the present disclosure.

While FIGS. 5 and 6 focus on embodiments related to stationary or semi-stationary wireless devices 16, FIGS. 7 and 8 focus on embodiments related to mobile wireless devices 16, but are not necessarily limited thereto. In particular, FIG. 7 illustrates the operation of the mobility manager 28 to obtain and use information from the database(s) 26 according to some embodiments of the present disclosure. In this embodiment, the database(s) 26 stores position-pair-dependent interference related information and, optionally, node-dependent interference related information for pairs of mobile wireless devices 16. In other words, the position pairs for which the position-pair-dependent interference related information is stored correspond to positions of mobile wireless devices 16. In some embodiments, the positions are represented as absolute positions or relative positions. Further, while the focus of the embodiment of FIG. 7 is mobile wireless devices 16, the process can also be used for both mobile and stationary or semi-stationary wireless devices 16.

As illustrated, the mobility manager 28 predicts locations, or positions, versus time paths for the wireless devices 16 or some subset thereof (step 400). In other words, the mobility manager 28 predicts future positions of the wireless devices 16. The mobility manager 28 may predict the future positions of the wireless devices 16 including times at which the wireless devices 16 will be at those positions using any suitable technique or combination of techniques. For example, the mobility manager 28 may predict the future positions of a wireless device 16 based on any one or any combination of, e.g., information directly or indirectly obtained from a GPS of the wireless device 16 (e.g., GPS location or GPS planned route/destination), where, e.g.,
        predicted future positions of the wireless device 16 may be predicted based on a historical record of the position of the wireless device 16, or
        predicted future positions of the wireless device 16 may be determined based on a route or destination planned for the wireless device 16 via a navigation system or a navigation application,
    information directly or indirectly obtained from mobility sensors on the wireless device 16 (e.g., a clinometer, a Doppler estimator, an accelerometer, and/or the like),
    information regarding the position and/or past positions of the wireless device 16 obtained from a network node associated with the cellular communications network 12-A or 12-B or some other network (e.g., a Wi-Fi network),
    road map information (road paths, speed limits, information regarding traffic lights, locations of stop signs, and/or the like), which may be used to restrict a set of possible predicted positions for the wireless device 16 or possibly all wireless devices 16,
    road traffic information to adapt the location prediction,
    historical routes/destinations for the wireless device 16 or a user of the wireless device 16, and/or
    application layer information related to a mobility path of the wireless device 16.

Also, any combination of the aforementioned information may be integrated, or combined, in order to come up with a probabilistic location versus time path for the wireless device 16.

In some embodiments, while not essential to the present disclosure, mobility prediction for the wireless devices 16 can be as discussed in the following references:

Apollinaire Nadembega et al., "A Destination and Mobility Path Prediction Scheme for Mobile Networks", IEEE Transactions on Vehicular Technology, Vol. 64, No. 6, June 2015, pages 2577-2590, which is directed at figuring out the path and destination of a mobile device; and
    H. Jeung et al., "Path prediction and predictive range querying in road network databases," The VLDB Journal, Vol. 19, No. 4, August 2010, pages 585-602, which is directed at predicting the position estimation for a given time.

In mobility prediction, one could predict translations of the wireless device 16 in three dimensional (3D) space, but also rotational information of the wireless device 16 at a given position in 3D space, which would have an impact on the receive and/or transmission beam orientation. That being said, mobility prediction is seen as possibly associated with a given node, so one could see the future position as a set of parameters including the node ID.

Rotational estimation can be network centric (e.g., obtained by measuring beam powers at certain access nodes), or device-centric (a device could have the appropriate sensors/measurements to compute its 3D orientations (3D gyroscope, compass . . . )). An exemplary model for prediction can be as follows: if the wireless device 16 is fixed on the roof of a car, the orientation may depend on the direction of the roads on which the car is traveling; if the wireless device 16 device is handheld, an assumption that there is no rotation other that the one associated with the direction of the mobility path may be used.

For a particular time (T), which may be a specific time or a time window/period, the mobility manager 28 obtains position-pair-dependent interference related information for the predicted (i.e., future) location, or position, of a wireless device 16 for the time (T) from the database(s) 26 (step 402). The mobility manager 28 obtains the position-pair-dependent interference related information by querying the database(s) 26 using the predicted location, or position, of the wireless device 16. The position-pair-dependent interference related information obtained from the database(s) 26 includes the position-pair-dependent interference related information for the position pairs in which the predicted position of the wireless device 16 is the RX position (e.g., the second position in the example of FIG. 3A). In addition to the position-pair-dependent interference related information, the database(s) 26 returns the TX positions (e.g., the first positions in the example of FIG. 3A) for the respective position pairs. Using FIG. 3A as an example, if the predicted position of the wireless device 16 is "C," then the position-pair-dependent interference related information obtained includes the path loss values for position pairs A,C and B,C. In addition, the respective TX positions "A" and "B" are communicated along with the respective path loss values.

The mobility manager 28 identifies one or more interfered node and interfering node pairs in which the wireless device 16 is the interfered node and the interference level is greater than a predefined threshold based on the position-pair-dependent interference related information obtained for the predicted location, or position, of the wireless device 16 and predicted locations, or positions, of other wireless devices 16 at the time (T) (step 404). More specifically, using the position-pair-dependent interference related information obtained for the predicted position of the wireless device 16, the mobility manager 28 is able to determine the TX positions for the position pairs for which the position-pair-dependent interference related information indicates an interference level that is greater than a predefined threshold (e.g., a path loss value that is less than a predefined value indicates a high interference level). Then, the TX positions can be correlated to the corresponding wireless devices 16 that have predicted locations, or positions, at the time (T) that correspond to those TX positions. In this manner, the interfered node (i.e., the RX node) and the interfering node (i.e., the TX node) pairs are identified. To be clear, in this example, the wireless device 16 for which the position-pair-dependent interference related information is obtained is the interfered node in all of the interfered node and interfering node pairs.

Optionally (as indicated by the dashed lines), the node also obtains node-dependent interference related information for the wireless devices 16 in the identified interfered node and interfering node pairs (step 406). For example, the node may query the database(s) 26 to obtain the TX pattern information for the interfering nodes (i.e., the TX nodes) in the identified interfered node and interfering node pairs and/or obtain the RX pattern information for the interfered node (i.e., the RX node) in the identified interfered node and interfering node pairs.

The node then takes one or more actions based on the identified interfered node and interfering node pair(s) and, optionally, the node-dependent interference related information obtained for the respective wireless devices 16 (step 408). For example, using the position-pair-dependent interference related information and the node-dependent interference related information for the wireless devices 16 in the interfered node and interfering node pairs, the node may identify one of the interfering nodes (i.e., one of the wireless devices 16) as a dominant interferer of the interfered node. The node may then notify, e.g., the wireless device 16 (i.e., the interfered node) and/or the base station 18 serving the wireless device 16 of the dominant interferer. Based on this knowledge, appropriate techniques can be used to, e.g., mitigate the interference to the wireless device 16 caused by the dominant interferer, perform interference cancellation, perform interference rejection combining, or the like.

FIG. 8 is a communication flow diagram that illustrates the operation of various nodes in connection with the processes of FIGS. 4 and 7 according to some embodiments of the present disclosure. As illustrated, the database manager 24 builds the database(s) 26, as describe above with respect to FIG. 4 (step 500). The mobility manager 28 predicts future locations, or positions, of one or more wireless devices 16, as described above with respect to step 400 of FIG. 7 (step 502). Optionally, the mobility manager 28 requests position-pair-dependent interference related information for a predicted future position at a time (T) of one of the wireless devices 16, as a RX node of interest (step 504). More specifically, the mobility manager 28 requests position-pair-dependent interference related information for a predicted future position of the RX node of interest at the time (T). The database manager 24 sends position-pair-dependent interference related information for the predicted future position of the RX node of interest at the time (T) to the mobility manager 28 (step 506). If the position-pair-dependent interference related information is provided in response to the request of step 504, then the position-pair-dependent interference related information may be limited to the position-pair-dependent interference related information for the position pairs in which the predicted position of the RX node of interest is the RX position. However, in other embodiments, the position-pair-dependent interference related information is proactively pushed to the mobility manager 28. In this case, the position-pair-dependent interference related information may include position-pair-dependent interference related information for position pairs including but not necessarily limited to position pairs in which the predicted position of the RX node is the RX position.

The mobility manager 28 identifies one or more interfered node and interfering node pairs in which the RX node of interest is the interfered node and the interference level is greater than a predefined threshold, as described above with respect to step 404 of FIG. 7 (step 508). Optionally, the mobility manager 28 requests and receives node-dependent interference related information for the wireless devices 16 in the identified interfered node and interfering node pairs, as described above with respect to step 406 of FIG. 7 (steps 510 and 512). The mobility manager 28 then takes one or more actions based on the identified interfered node and interfering node pair(s) and, optionally, the node-dependent interference related information for the respective wireless devices 16, as described above with respect to step 408 of FIG. 7 (step 514).

Figure 9:
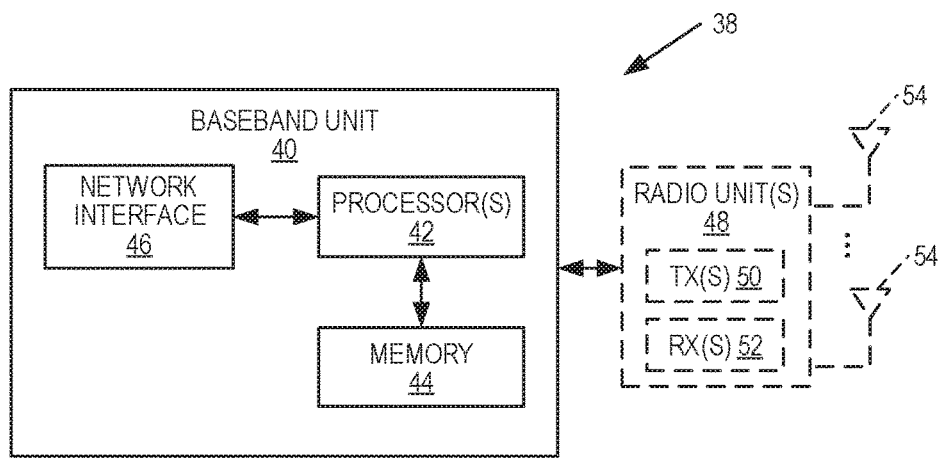
FIGS. 9 through 13 illustrate various embodiments of a network node according to embodiments of the present disclosure.

FIG. 9 illustrates a network node 38 according to some embodiments of the present disclosure. The network node 38 may be, for example, the base station 18, a network node hosting the mobility manager 28 where the mobility manager 28 is implemented as software, or the mobility manager 28 where the mobility manager 28 is implemented as a combination of hardware and software. As illustrated, the network node 38 includes a baseband unit 40 that includes one or more processors 42 (e.g., one or more Central Processing Units (CPUs), one or more Application Specific Integrated Circuits (ASICs), one or more Field Programmable Gate Arrays (FPGAs), or the like, or any combination thereof), memory 44, and a network interface 46. Further, in some embodiments, the network node 38 includes one or more radio units 48 including one or more transmitters 50 and one or more receivers 52 coupled to one or more antennas 54. In some embodiments, the functionality of the database manager 24, the mobility manager 28, and/or the RRM controller/coordinator 34 is implemented in software that is stored in memory 44 and executed by the one or more processors 42. Note, however, that the database manager 24, the mobility manager 28, and the RRM controller/coordinator 34 may be implemented on the same network node 38 or separate network nodes 38.

In some embodiments, a computer program(s) including instructions which, when executed by at least one processor, causes the at least one processor to carry out the functionality of the database manager 24, the mobility manager 28, and/or the RRM controller/coordinator 34 according to any of the embodiments described herein is provided. In some embodiments, a carrier(s) containing the aforementioned computer program(s) product is provided. The carrier is one of an electronic signal, an optical signal, a radio signal, or a computer readable storage medium (e.g., a non-transitory computer readable medium such as the memory 44).

Figure 10:
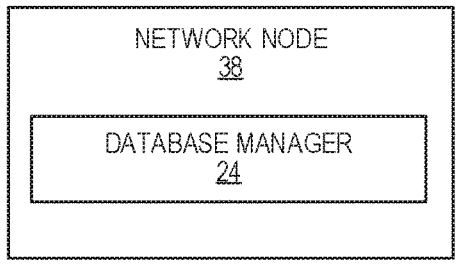

FIG. 10 illustrates the network node 38 according to some embodiments in which the database manager 24 is implemented on the network node 38. The database manager 24 is, in this example, implemented as software that is stored (e.g., in memory) and executed by one or more processors (not shown) of the network node 38.

Figure 11:
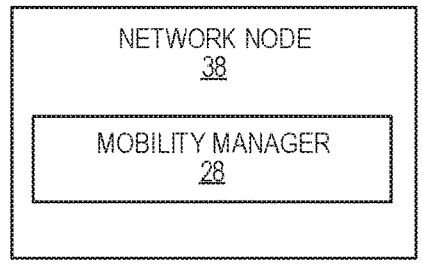

FIG. 11 illustrates the network node 38 according to some embodiments in which the mobility manager 28 is implemented on the network node 38. The mobility manager 28 is, in this example, implemented as software that is stored (e.g., in memory) and executed by one or more processors (not shown) of the network node 38.

Figure 12:
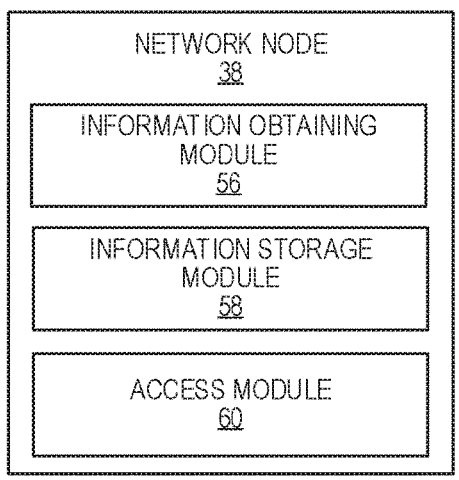

FIG. 12 illustrates the network node 38 according to some embodiments of the present disclosure. In this example, the network node 38 includes an information obtaining module 56, an information storage module 58, and an access module 60, each of which is implemented in software. The modules 56 through 60 operate to provide the functionality of the database manager 24. In particular, the information obtaining module 56 operates to obtain the position-pair-dependent interference related information and/or the node-dependent interference related information, as described above. The information storage module 58 operates to store the obtained information in one or more databases, as described above. The access module 60 provides access to the information stored in the one or more databases, as described above.

Figure 13:
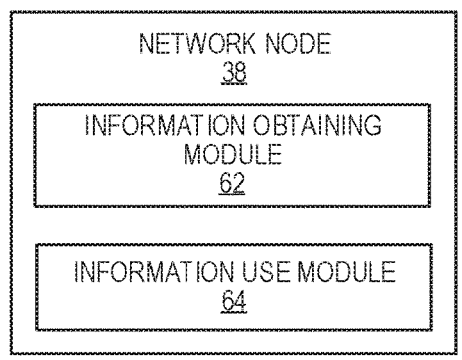

FIG. 13 illustrates the operation of the network node 38 according to some other embodiments of the present disclosure. In this example, the network node 38 is a network node (e.g., a base station 18 or a network node functioning as the mobility manager 28) that obtains information from the database(s) and uses the information to, e.g., identify one or more dominant interferers for a wireless device 16 (i.e., a RX node) of interest and then, e.g., take one or more actions to mitigate interference from the one or more dominant interferers. In particular, the network node 38 includes an information obtaining module 62 and an information use module 64, each of which is implemented in software. The information obtaining module 62 obtains information from the one or more databases, e.g., via the database manager 24, as described above. The information use module 64 uses the information obtained from the database(s) to, e.g., identify interfered node and interfering node pairs for a wireless device 16 of interest (e.g., a RX node) and, e.g., identify one or more of the interfering nodes as dominant interferers and, e.g., take one or more actions to mitigate the interference caused to the wireless device 16 of interest by the one or more dominant interferers.

Figure 14:
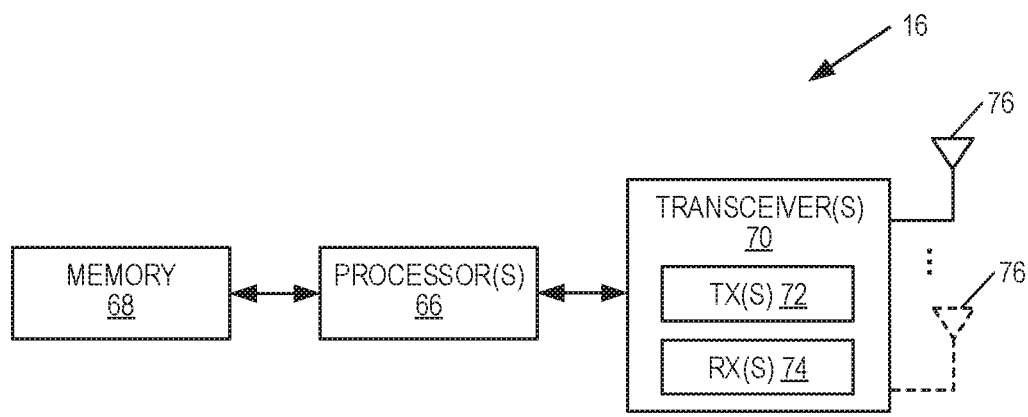
FIGS. 14 and 15 illustrate embodiments of a wireless device according to some embodiments of the present disclosure.

FIG. 14 illustrates one of the wireless devices 16 according to some embodiments of the present disclosure. As illustrated, the wireless device 16 includes one or more processors 66, memory 68, and one or more transceivers 70 including one or more transmitters 72 and one or more receivers 74 coupled to one or more antennas 76. In some embodiments, the functionality of the wireless device 16 described herein is implemented in software that is stored in the memory 68 and executed by the one or more processors 66.

In some embodiments, a computer program(s) including instructions which, when executed by at least one processor, causes the at least one processor to carry out the functionality of the wireless device 16 according to any of the embodiments described herein is provided. In some embodiments, a carrier(s) containing the aforementioned computer program(s) product is provided. The carrier is one of an electronic signal, an optical signal, a radio signal, or a computer readable storage medium (e.g., a non-transitory computer readable medium such as the memory 68).

Figure 15:
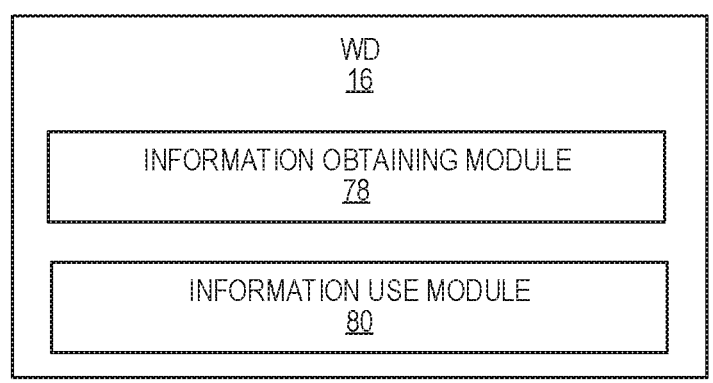

FIG. 15 illustrates the wireless device 16 according to some embodiments of the present disclosure. As illustrated, the wireless device 16 includes an information obtaining module 78 and an information use module 80, each of which is implemented in software. The information obtaining module 78 obtains information from the one or more databases, e.g., via the database manager 24, as described above. The information use module 80 uses the information obtained from the database(s) to, e.g., identify interfered node and interfering node pairs for the wireless device 16 (e.g., as a RX node) and, e.g., identify one or more of the interfering nodes as dominant interferers and, e.g., take one or more actions to mitigate the interference caused to the wireless device 16 by the one or more dominant interferers.

Systems and methods are described herein that, e.g., enhance location-based RRM by including a database(s) storing interference related information associated with position pairs and with particular nodes. Note that while the nodes for which the interference related information is obtained and stored are described as being the wireless devices 16, the database(s) may additionally include interference related information for any type of radio node (e.g., wireless devices 16 and/or radio access nodes (e.g., base stations 18)).

In some embodiments, the position-pair-dependent interference related information includes, for a position pair, one or more parameter values that are indicative of a (predicted)

level of interference caused by transmissions occurring at one position in the position pair to receptions occurring at the other position in the position pair. The values indicative of the (predicted) level of interference, and thus the (predicted) level of interference, for a position pair may be probabilistic or deterministic. In some embodiments, since any knowledge can be beneficial, even a partial database covering only stationary or semi-stationary nodes, which is more easily constructed and managed, can be used. Mobile nodes can also be included, especially if their mobility is small or if the mobility pattern is predictable and can be mapped to, e.g., a path loss, either through geographical modeling like ray-tracing, or through information harvested from historical measurements, possibly obtained from other mobile nodes.

In some embodiments, the interference related information in the database(s) is used to identify dominant interferers for future receptions for each node. As such, nodes would have knowledge about the identity of some possible dominant interferers and could, for example, adapt their RRM strategy to the a priori knowledge of activity and impact of those dominant interferers. Knowledge of the activity (e.g., use of time/frequency/space/code resources) of nodes can be shared through the database, if the transmissions are planned or predictable (e.g., for certain MTC communications, for example), or obtained through TTI-level coordinated scheduling. The information in the database related to the interferer impact is, in some embodiments, obtained through training, e.g., with some form of coordinated scheduling, and is, in some embodiments, updated (e.g., continuously) based on measurements made, e.g., during live operations. In some embodiments, new nodes not previously visible by the relevant set of nodes can be identified as an interferer for certain nodes and added to the database. Inputs related to interference impact, for that new node, can be obtained and tracked, e.g., via active probing (e.g., via forced uplink scheduling of bogus data), or through passive learning over the normally scheduled operations, or through prediction using, e.g., mobility prediction and path loss prediction. Information related to the planned scheduling may, in some embodiments, be obtained either through passive learning over the normally scheduled operations, or obtained from the application doing the scheduling plan.

While not being limited to or by any particular advantages, in some embodiments, one or more of the following advantages may be provided. The more a priori information that is available in the RRM procedure, the better the resource management is adapted to the traffic and interference channel characteristics, and the better the resulting system throughput is. For example, coordination of transmissions can prevent transmission collisions from a dominant interferer. The database(s) described herein could, in some embodiments, be accessible from the application-level scheduler to plan scheduling for transmissions which can be planned (e.g., for certain applications with MTCs).

As another example, the database(s) described herein can enable joint reception uplink CoMP with knowledge of the activity of certain dominant interferers such that a parametric conditional estimation procedure can be used to obtain a more accurate noise plus interference covariance matrix estimate. This can be used to have a better receiver, but also to allow the use of a more aggressive link adaptation, which translates into higher throughput. Parametric conditional estimation of the noise plus interference covariance matrix could be done without having a database to refer to, but having a database(s) allow to exploit a priori knowledge of the dominant interferers (their identity and impact) instead of having to run an identification and learning procedure from scratch each time the dominant interferer initiates a new session. The database approach therefore allows some interference memory to be preserved between sessions, so that interference prediction is facilitated, convergence to a proper RRM point of operation is achieved more quickly, estimation errors are reduced, and higher performance is achieved.

In some cases, it might not be practical to enable mobility prediction and the associated path loss prediction. As indicated previously, even knowledge about a subset of nodes can be valuable. In this case, the subset would be associated with fixed nodes. In present networks, most network nodes are part of a fixed infrastructure, but only a fraction of user devices are "fixed" in position for an extended period of time. Still, note that, when MTCs become more pervasive, this fraction might become quite substantial, so that the knowledge of the interference impact of the associated devices could translate into substantial performance gains. Also note that it is quite possible that, in certain deployments, for certain applications, a virtual network dedicated to a set of machines might be embedded in physical networks by slicing the frequency resources. Within such a virtual network, all user devices might be fixed in position for extended periods of time, and the benefits of the database(s) described herein could be great, while the solution, without mobility prediction, would be relatively simple.

Embodiments described herein also enable smarter ad-hoc networking functionality since it provides, through the database(s), not only transmit patterns, but also RX scheduling patterns (Discontinuous Transmission (DTX)/DRX patterns). Knowledge of the DRX patterns are associated with knowledge of the moments for which a D2D transmission to a given neighbor device cannot be successful. The DTX information associated with interfering nodes provides information related to the probability of having a successful transmission to a given node. The a priori information about the DRX/DTX can therefore facilitate the network discovery phase and the setup of proper D2D communication between appropriate nodes.

The following acronyms are used throughout this disclosure.

3D Three Dimensions
    3GPP $3^{rd}$ Generation Partnership Project
    ASIC Application Specific Integrated Circuit
    BS Base Station
    CoMP Coordinated Multi-Point
    CPU Central Processing Unit
    D2D Device-to-Device
    dB Decibel
    DRX Discontinuous Reception
    DTX Discontinuous Transmission
    eNB Enhanced or Evolved Node B
    FCC Federal Communications Commission
    FPGA Field Programmable Gate Array
    GPS Global Positioning System
    ID Identifier
    KPI Key Performance Indicator
    LTE Long Term Evolution
    M2M Machine to Machine
    MCC Multipoint Cooperative Communication
    MCS Modulation and Coding Scheme
    MME Mobility Management Entity
    MTC Machine Type Communication
    PDN Packet Data Network
    P-GW Packet Data Network Gateway
    PRB Physical Resource Block QoS Quality of Service
RAT Radio Access Technology
RRM Radio Resource Management
RX Receive
S-GW Serving Gateway
TDD Time Division Duplexing
TTI Transmit Time Interval
TV Television
TX Transmit
UE User Equipment
UHF Ultra High Frequency
VHF Very High Frequency Those skilled in the art will recognize improvements and modifications to the embodiments of the present disclosure. All such improvements and modifications are considered within the scope of the concepts disclosed herein and the claims that follow.

What is claimed is:

1. A method of operation of a node associated with one or more cellular communications networks, comprising:
   obtaining position-pair-dependent interference related information for pairs of positions, the position-pair-dependent interference related information comprising, for each pair of positions comprising a first position and a second position, information regarding interference caused by wireless transmissions originating at the first position to wireless receptions at the second position;
   identifying one or more interfered node and interfering node pairs having an interference level that is greater than a predefined threshold based on the position-pair-dependent interference related information for the position of a receive node;
   storing interference related information comprising the position-pair-dependent interference related information in one or more databases; and
   providing access to the one or more databases to enable taking one or more actions with respect to mitigating interference to the receive node from at least one of the interfering nodes as dominant interferer in the one or more interfered node and interfering node pairs where the one or more actions including at least one action chosen from the group consisting of:
   performing interference cancellation; and
   performing interference rejection combining.

2. The method of claim 1 further comprising:
   obtaining node-dependent interference related information for at least one of a plurality of wireless devices;
   wherein storing the interference related information comprises storing the interference related information comprising the position-pair-dependent interference related information for the pairs of positions and the node-dependent interference related information for at least one of the plurality of wireless devices in the one or more databases.

3. The method of claim 2 wherein, for each wireless device of the at least one of the plurality of wireless devices, the node-dependent interference related information comprises transmit pattern information for the wireless device.

4. The method of claim 3 wherein the transmit pattern information for the wireless device comprises information indicative of one or more future time periods during which the wireless device will be transmitting, one or more frequency resources or other detection space on which the wireless device will be transmitting during the one or more future time periods, and one or more transmit power levels at which the wireless device will be transmitting during the one or more future time periods.

5. The method of claim 4 wherein the transmit pattern information for the wireless device further comprises information indicative of one or more beam patterns which the wireless device will be transmitting during the one or more future time periods.

6. The method of claim 2 wherein, for each wireless device of the at least one of the plurality of wireless devices, the node-dependent interference related information comprises receive pattern information for the wireless device.

7. The method of claim 6 wherein the receive pattern information for the wireless device comprises information indicative of one or more future time periods during which the wireless device will be receiving and one or more frequency resources or other detection space on which the wireless device will be receiving during the one or more future time periods.

8. The method of claim 7 wherein the receive pattern information for the wireless device further comprises information indicative of one or more directions from which the wireless device will be receiving during the one or more future time periods.

9. The method of claim 7 wherein the receive pattern information for the wireless device further comprises information indicative of one or more predicted noise floor levels at the wireless device during the one or more future time periods.

10. The method of claim 1 wherein each position in the pairs of positions is represented as one or more of a group consisting of: an absolute position in a discretization of two-dimensional or three-dimensional space, a relative position that is relative to a reference point, and an identifier of a stationary or semi-stationary wireless device.

11. The method of claim 1 wherein the position-pair-dependent interference related information for at least some of the pairs of positions comprises path loss for a wireless communication path between the first position and the second position.

12. The method of claim 1 wherein the position-pair-dependent interference related information for at least some of the pairs of positions comprises receive power for wireless receptions at the second position for wireless transmissions from the first position.

13. The method of claim 1 wherein providing access to the one or more databases comprises:
    receiving a request for position-pair-dependent interference related information for a position; and
    returning the position-pair-dependent interference related information stored in the one or more databases for any of the pairs of positions that include the position as the second position.

14. A node associated with one or more cellular communications networks, comprising:
    one or more processors; and
    memory containing instructions executable by the one or more processors whereby the node is operable to:
    obtain position-pair-dependent interference related information for pairs of positions, the position-pair-dependent interference related information comprising, for each pair of positions comprising a first position and a second position, information regarding interference caused by wireless transmissions originating at the first position to wireless receptions at the second position;
    identifying one or more interfered node and interfering node pairs having an interference level that is greater than a predefined threshold based on the position-pair-dependent interference related information for the position of a receive node;

store information comprising the position-pair-dependent interference related information in one or more databases; and provide access to the one or more databases to enable taking one or more actions with respect to mitigating interference to the receive node from at least one of the interfering nodes as dominant interferer in the one or more interfered node and interfering node pairs where the one or more actions including at least one action chosen from the group consisting of:

performing interference cancellation; and performing interference rejection combining.

15. A node associated with one or more cellular communications networks, comprising:

means for obtaining position-pair-dependent interference related information for pairs of positions, the position-pair-dependent interference related information comprising, for each pair of positions comprising a first position and a second position, information regarding interference caused by wireless transmissions originating at the first position to wireless receptions at the second position;

identifying one or more interfered node and interfering node pairs having an interference level that is greater than a predefined threshold based on the position-pair-dependent interference related information for the position of a receive node;

storing information comprising the position-pair-dependent interference related information in one or more databases; and providing access to the one or more databases to enable taking one or more actions with respect to mitigating interference to the receive node from at least one of the interfering nodes as dominant interferer in the one or more interfered node and interfering node pairs where the one or more actions including at least one action chosen from the group consisting of:

performing interference cancellation; and performing interference rejection combining.

16. A method of operation of a node associated with one or more cellular communications networks, comprising:

obtaining position-pair-dependent interference related information for a position of a receive node from one or more databases, the position-pair-dependent interference related information for the position of the receive node comprises, for each of one or more position pairs each comprising a first position and a second position corresponding to the position of the receive node, information regarding interference caused by wireless transmissions originating at the first position to wireless receptions at the second position;

identifying one or more interfered node and interfering node pairs having an interference level that is greater than a predefined threshold based on the position-pair-dependent interference related information for the position of the receive node, wherein:

each interfered node and interfering node pair corresponds to a different position pair of the one or more position pairs, and for each interfered node and interfering node pair, the interfered node is the receive node having the position that corresponds to the second position in the corresponding position pair and the interfering node is a transmit node having a position that corresponds to the first position in the corresponding position pair, and the interference level for the interfered node and interfering node pair is indicated by the position-pair-dependent interference related information for the corresponding position pair; and taking one or more actions with respect to mitigating interference to the receive node from at least one of the interfering nodes as dominant interferer in the one or more interfered node and interfering node pairs where the one or more actions includes at least one action chosen from the group consisting of:

performing interference cancellation; and performing interference rejection combining.

17. The method of claim 16 wherein the position-pair-dependent interference related information for at least some of the one or more position pairs comprises path loss for a wireless communication path between the first position and the second position.

18. The method of claim 16 wherein the position-pair-dependent interference related information for at least some of the one or more position pairs comprises receive power for wireless receptions at the second position for wireless transmissions from the first position.

19. The method of claim 16 further comprising:

obtaining, from the one or more databases, node-dependent interference related information for each of the transmit nodes and the receive node in the one or more interfered node and interfering node pairs; wherein taking the one or more actions comprises identifying at least one of the interfering nodes of the one or more interfered node and interfering node pairs as the dominant interferer based on the node-dependent interference related information.

20. The method of claim 19 wherein, for each of the transmit nodes, the node-dependent interference related information comprises transmit pattern information for the transmit node.

21. The method of claim 20 wherein the transmit pattern information for the transmit node comprises information indicative of one or more future time periods during which the transmit node will be transmitting, one or more frequency resources or other detection space on which the transmit node will be transmitting during the one or more future time periods, and one or more transmit power levels at which the transmit node will be transmitting during the one or more future time periods.

22. The method of claim 21 wherein the transmit pattern information for the transmit node further comprises information indicative of one or more beam patterns in which the transmit node will be transmitting during the one or more future time periods.

23. The method of claim 19 wherein the node-dependent interference related information comprises receive pattern information for the receive node.

24. The method of claim 23 wherein the receive pattern information for the receive node comprises information indicative of one or more future time periods during which the receive node will be receiving and one or more frequency resources or other detection space on which the receive node will be receiving during the one or more future time periods.

25. The method of claim 24 wherein the receive pattern information for the receive node further comprises information indicative of one or more beam patterns from which the receive node will be receiving during the one or more future time periods.

26. The method of claim 24 wherein the receive pattern information for the receive node further comprises information indicative of one or more predicted noise floor levels at the receive node during the one or more future time periods.

27. The method of claim 16 where each position of each position in the one or more position pairs is represented as one or more of a group consisting of: an absolute position in a discretization of two-dimensional or three-dimensional space, a relative position that is relative to a reference point, and an identifier of a stationary or semi-stationary wireless device.

28. The method of claim 16 wherein the receive node is a stationary or semi-stationary wireless device.

29. The method of claim 28 wherein the position of the receive node is represented as a node identifier of the receive node.

30. The method of claim 28 wherein the transmit nodes of the one or more interfered node and interfering node pairs are stationary or semi-stationary wireless devices.

31. The method of claim 30 wherein the position of the receive node is represented as a node identifier of the receive node, and the position of each of the transmit nodes is represented as a node identifier of the transmit node.

32. The method of claim 16 wherein the receive node is a mobile wireless device, and the position of the mobile wireless device is a predicted future position of the mobile wireless device.

33. The method of claim 32 wherein the predicted future position of the mobile wireless device is represented as at least one of a group consisting of: an absolute position in a discretization of two-dimensional or three-dimensional space, and a relative position that is relative to a reference point.

34. The method of claim 32 wherein the transmit nodes of the one or more interfered node and interfering node pairs are mobile wireless devices, and the positions of the transmit nodes are predicted future positions of the transmit nodes.

35. The method of claim 34 wherein the predicted future position each of the receive node and the transmit nodes is represented as at least one of one of a group consisting of: an absolute position in a discretization of two-dimensional or three-dimensional space, and a relative position that is relative to a reference point.

36. A node of a cellular communications network, comprising:
one or more processors; and
memory containing instructions executable by the one or more processors whereby the node is operable to:
obtain position-pair-dependent interference related information for a position of a receive node from one or more databases, the position-pair-dependent interference related information for the position of the receive node comprises, for each of one or more position pairs each comprising a first position and a second position corresponding to the position of the receive node, information regarding interference caused by wireless transmissions originating at the first position to wireless receptions at the second position;
identify one or more interfered node and interfering node pairs having an interference level that is greater than a predefined threshold based on the position-pair-dependent interference related information for the position of the receive node, wherein:
each interfered node and interfering node pair corresponds to a different position pair of the one or more position pairs, and
for each interfered node and interfering node pair, the interfered node is the receive node having the position that corresponds to the second position in the corresponding position pair and the interfering node is a transmit node having a position that corresponds to the first position in the corresponding position pair, and the interference level for the interfered node and interfering node pair is indicated by the position-pair-dependent interference related information for the corresponding position pair; and
take one or more actions with respect to mitigating interference to the receive node from at least one of the interfering nodes as dominant interferer in the one or more interfered node and interfering node pairs where the one or more actions includes at least one action chosen from the group consisting of:
performing interference cancellation; and
performing interference rejection combining.

37. A node of a cellular communications network, comprising:
means for obtaining position-pair-dependent interference related information for a position of a receive node from one or more databases, the position-pair-dependent interference related information for the position of the receive node comprises, for each of one or more position pairs each comprising a first position and a second position corresponding to the position of the receive node, information regarding interference caused by wireless transmissions originating at the first position to wireless receptions at the second position;
means for identifying one or more interfered node and interfering node pairs having an interference level that is greater than a predefined threshold based on the position-pair-dependent interference related information for the position of the receive node, wherein:
each interfered node and interfering node pair corresponds to a different position pair of the one or more position pairs, and
for each interfered node and interfering node pair, the interfered node is the receive node having the position that corresponds to the second position in the corresponding position pair and the interfering node is a transmit node having a position that corresponds to the first position in the position pair, and the interference level for the interfered node and interfering node pair is indicated by the position-pair-dependent interference related information for the corresponding position pair; and
means for taking one or more actions with respect to mitigating interference to the receive node from at least one of the interfering nodes as dominant interferer in the one or more interfered node and interfering node pairs where the one or more actions includes at least one action chosen from the group consisting of:
performing interference cancellation; and
performing interference rejection combining.

* * * * *